(12) United States Patent
Wang et al.

(10) Patent No.: US 11,009,859 B2
(45) Date of Patent: May 18, 2021

(54) FRAMEWORK FOR PRIVACY-PRESERVING BIG-DATA SHARING USING DISTRIBUTED LEDGER

(71) Applicant: FISHER-ROSEMOUNT SYSTEMS, INC., Round Rock, TX (US)

(72) Inventors: Gang Wang, Stors, CT (US); Mark J. Nixon, Round Rock, TX (US); Anthony Amaro, Jr., Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 77 days.

(21) Appl. No.: 16/404,147

(22) Filed: May 6, 2019

(65) Prior Publication Data
US 2020/0356082 A1 Nov. 12, 2020

(51) Int. Cl.
*H04L 29/06* (2006.01)
*G05B 19/418* (2006.01)
(Continued)

(52) U.S. Cl.
CPC ........ *G05B 19/4185* (2013.01); *H04L 9/0643* (2013.01); *H04L 9/3247* (2013.01); *H04L 63/0428* (2013.01); *G05B 2219/31449* (2013.01)

(58) Field of Classification Search
CPC ...... G05B 19/4185; G05B 2219/31449; H04L 9/3247; H04L 63/0428; H04L 9/0643
See application file for complete search history.

(56) References Cited

U.S. PATENT DOCUMENTS

| 2016/0098037 A1 | 4/2016 | Zornio et al. |
| 2017/0046694 A1 | 2/2017 | Chow et al. |
| (Continued) | | |

FOREIGN PATENT DOCUMENTS

| CN | 109164780 A | 1/2019 |
| EP | 3 193 299 A1 | 7/2017 |
| (Continued) | | |

OTHER PUBLICATIONS

Xie et al., 2017 3rd International Conference on Big Data Computing and Communications, "Secured Data Storage Scheme based on Block Chain for Agricultural Products Tracking" (Year: 2017).*
U.S. Appl. No. 16/248,323, filed Jan. 15, 2019.
U.S. Appl. No. 16/248,367, filed Jan. 15, 2019.
U.S. Appl. No. 16/248,355, filed Jan. 15, 2019.
U.S. Appl. No. 16/248,377, filed Jan. 15, 2019.
U.S. Appl. No. 16/248,388, filed Jan. 15, 2019.
(Continued)

*Primary Examiner* — Joseph P Hirl
*Assistant Examiner* — Ka Shan Choy
(74) *Attorney, Agent, or Firm* — Marshall, Gerstein & Borun LLP

(57) ABSTRACT

To provide a trusted, secure, and immutable record of storage operations executed by a storage center for storing measurement data provided by a process plant, techniques are described for utilizing a distributed ledger. When a data contributor such as a process plant generates measurement data, an encrypted version of a set of measurement data is transmitted to a storage center for secure storage of the measurement data. In some instances, the data contributor divides the set of measurement data into several subsets and transmits each subset of encrypted measurement data to a different storage center. Furthermore, the storage center generates a transaction for the storage operation which is recorded in a distributed ledger. When a data subscriber retrieves the encrypted measurement data from a storage center, the data subscriber can verify the authenticity of the data based on the information recorded in the distributed ledger.

15 Claims, 13 Drawing Sheets

(51) Int. Cl.
  *H04L 9/06* (2006.01)
  *H04L 9/32* (2006.01)

(56) References Cited

U.S. PATENT DOCUMENTS

| | | |
|---|---|---|
| 2017/0048216 A1 | 2/2017 | Chow et al. |
| 2017/0243222 A1 | 8/2017 | Balasubramanian |
| 2018/0094953 A1 | 4/2018 | Colson et al. |
| 2018/0130130 A1 | 5/2018 | Dechu et al. |
| 2018/0253702 A1 | 9/2018 | Dowding |
| 2018/0349879 A1 | 12/2018 | High et al. |
| 2019/0012637 A1 | 1/2019 | Gillen |
| 2019/0081796 A1 | 3/2019 | Chow et al. |
| 2019/0114706 A1 | 4/2019 | Bell et al. |
| 2019/0158594 A1* | 5/2019 | Shadmon ............... H04L 9/088 |
| 2019/0340269 A1 | 11/2019 | Biernat et al. |
| 2019/0342077 A1 | 11/2019 | McMurdie et al. |
| 2019/0354723 A1 | 11/2019 | Dassenno |
| 2020/0021444 A1 | 1/2020 | Young et al. |
| 2020/0034457 A1 | 1/2020 | Brody et al. |
| 2020/0044833 A1 | 2/2020 | Shpurov et al. |
| 2020/0052903 A1 | 2/2020 | Lam et al. |
| 2020/0065761 A1 | 2/2020 | Tatchell |
| 2020/0112434 A1* | 4/2020 | Goodson ............ H04L 63/0435 |
| 2020/0143300 A1 | 5/2020 | Weldemariam et al. |
| 2020/0219053 A1 | 7/2020 | Subramaniam et al. |
| 2020/0225643 A1 | 7/2020 | Tugbo et al. |
| 2020/0226123 A1 | 7/2020 | Nixon et al. |
| 2020/0228316 A1 | 7/2020 | Cahill |
| 2020/0228342 A1 | 7/2020 | Nixon et al. |

FOREIGN PATENT DOCUMENTS

| | | |
|---|---|---|
| EP | 3 365 633 A1 | 8/2018 |
| WO | WO-2017/067587 A1 | 4/2017 |
| WO | WO-2018/059850 A1 | 4/2018 |
| WO | WO-2018/059854 A1 | 4/2018 |
| WO | WO-2018/222066 A1 | 12/2018 |
| WO | WO-2019/007396 A1 | 1/2019 |

OTHER PUBLICATIONS

"Blockchain for Business" (Sep. 1, 2016) «https://www.ibm.com/blockchain/for-business».

"Can Blockchain be Used to Create Secure Industrial IoT Networks?" (May 8, 2017) <https://www.bayshorenetworks.com/blog/can-blockchain-be-used-to-create-secure-industrial-iot-networks>.

Gudymenko et al., "Blockchain-Based Smart Industry Integration: Demystiphying Blockchain," (Dec. 18, 2017) <<http://st.inf.tu-dresden.de/files/teaching/ws17/ring/Demystiphying%20blockchain-TU%20Dresden%20Ringvorlesung_T-Systems%20MMS.pdf>>.

Government Office for Science, "Distributed Ledger Technology: Beyond Block Chain," (2016).

Search Report for Application No. GB2000415.6, dated Jun. 26, 2020.

Search Report for Application No. GB2000417.2, dated Jun. 29, 2020.

Search Report for Application No. GB2000418.0, dated Jun. 26, 2020.

Search Report for Application No. GB2000573.2, dated Jul. 10, 2020.

Bencic et al., "Distributed Ledger Technology: Blockchain Compared to Directed Acyclic Graph," IEEE 38th International Conference on Distributed Computing Systems (2018).

Dhakal et al., "Private Blockchain Network for IoT Device Firmware Integrity Verification and Update," IEEE 19th International Symposium on High Assurance Systems Engineering, pp. 164-170 (2019).

Nguyen et al., "Leveraging Blockchain to Enhance Data Privacy in IoT-Based Applications," Springer International Publishing, pp. 211-221 (2018).

Search Report for Application No. GB2000416.4, dated Aug. 28, 2020.

Search Report for Application No. GB2005105.8, dated Oct. 27, 2020.

* cited by examiner

FRAMEWORK FOR PRIVACY-PRESERVING BIG-DATA SHARING USING DISTRIBUTED LEDGER

TECHNICAL FIELD

The present disclosure relates generally to process plants and to process control systems, and more particularly, to the use of distributed ledgers for secure storage of data generated by data contributors, such as process plants.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters such as pressure, temperature, etc., and the like to control one or more process executing within the process plant or system. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system. As utilized herein, field devices and controllers are generally referred to as "process control devices."

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, a process control system of a process plant includes field devices, controllers, workstations, and other devices that are interconnected by a set of layered networks and buses. The process control system may, in turn, be connected with various business and external networks, e.g., to reduce manufacturing and operational costs, enhance productivity and efficiencies, provide timely access to process control and/or process plant information, etc. On the other hand, the interconnection of process plants and/or process control systems to enterprise and/or external networks and systems increases the risk of cyber intrusions and/or malicious cyber attacks that may arise from expected vulnerabilities in commercial systems and applications, such as those used in enterprise and/or external networks. Cyber intrusions and malicious cyber attacks of process plants, networks, and/or control systems may negatively affect the confidentiality, integrity, and/or availability of information assets, which, generally speaking, are vulnerabilities similar to those of general purpose computing networks. However, unlike general purpose computer networks, cyber intrusions of process plants, networks, and/or control systems may also lead to damage, destruction, and/or loss of not only plant equipment, product, and other physical assets, but also to the loss of human life. For example, a cyber intrusion may cause a process to become uncontrolled, and thereby produce explosions, fires, floods, exposure to hazardous materials, etc. Thus, securing communications related to process control plants and systems is of paramount importance.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

Currently, there exists a lack of trust between data contributors, such as process plants, hospitals, etc., which generate these large data sets and storage centers which store the large data sets. Typically, data contributors contract with a single storage center to store the large data sets. However, this leads to vulnerabilities if the security of the single storage center is compromised. Data contributors also do not want to share the data with storage centers due to privacy concerns. Moreover, data subscribers such as analytics and deep learning companies typically do not trust the integrity of the data sets provided by the storage centers.

SUMMARY

Techniques, systems, apparatuses, components, devices, and methods are disclosed for utilizing a distributed ledger, or blockchain, in process control systems and storage centers. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes that operate to manufacture, refine, transform, generate, or produce physical materials or products.

To address trust, privacy, and security issues between data contributors such as process plants, storage centers, and data subscribers, the data contributors send encrypted data to the storage centers rather than sending the raw data. The data may include measurement data generated by field devices or process plant entities including devices within a process plant for use in a portion of the process which contain, transform, generate, or transfer physical materials, such as a valve, a tank, a mixer, a pump, a heat exchanger, etc. The measurement data may include process parameter values for process parameters corresponding to the process plant entities. The measurement data may also include product parameter values such as properties of a physical material or product produced by the process plant, including a temperature of the product, a volume of the product, a mass of the product, a density of the product, a pressure of the product, etc.

By encrypting the data and sending the encrypted data to the storage centers, the data is less vulnerable to an attack, because a hacker cannot obtain the raw data by gaining unauthorized access to a storage center.

Furthermore, in addition to storing encrypted measurement data at the storage centers, the storage centers maintain a distributed ledger by generating and validating transactions regarding storage operations which are broadcasted to a distributed ledger network. In some scenarios, the transactions include an identifier of the storage center storing the encrypted measurement data, an identifier of the data contributor that generated the encrypted measurement data, an identifier of the encrypted measurement data for retrieving the encrypted measurement data from the corresponding storage center, and an indication of the encrypted measurement data. In some implementations, the indication of the encrypted measurement data is a cryptographic hash value corresponding to the encrypted measurement data.

A data subscriber, such as an analytics or deep learning company may then retrieve the encrypted measurement data from the storage center and the indication of the encrypted measurement data from the distributed ledger and the compare the two to verify the authenticity of the encrypted measurement data. Moreover, the data contributor provides decryption information for the data subscriber to decrypt the encrypted measurement data, such as a one-time pad.

In some implementations, a data contributor divides a set of encrypted measurement data into several subsets. The data contributor then provides each subset to a different storage center which stores the encrypted subset and generates a transaction including an indication of the encrypted subset which is recorded in the distributed ledger. Then when a data subscriber requests at least some of the measurement data or a set of measurement data, the data contributor provides identification information to the data subscriber for retrieving each encrypted subset from the storage centers in which each respective encrypted subset is stored. The data contributor also provides decryption information for the data subscriber to decrypt each encrypted subset, such as one-time pads. Then the data subscriber decrypts each encrypted subset and combines the subsets to generate the set of measurement data.

By utilizing distributed ledgers in process plants or storage centers that store encrypted measurement data generated by the process plants, each storage center or a network of storage centers may provide a trusted, secure, and immutable record of measurement data. The secure, immutable, and trustless nature of distributed ledgers is particularly important in process control systems where cyber intrusions may lead to damage, destruction, and/or loss of not only plant equipment, product, and other physical assets, but also to the loss of human life. Additionally, the secure, immutable, and trustless nature of distributed ledgers is also particularly important in storage centers where both data contributors and data subscribers do not trust the storage centers to maintain the integrity and ensure privacy of the data. Due to the difficulty of changing the recorded data in the distributed ledgers, competing entities do not have to trust that the data is reliable.

DETAILED DESCRIPTION

Figure 1:
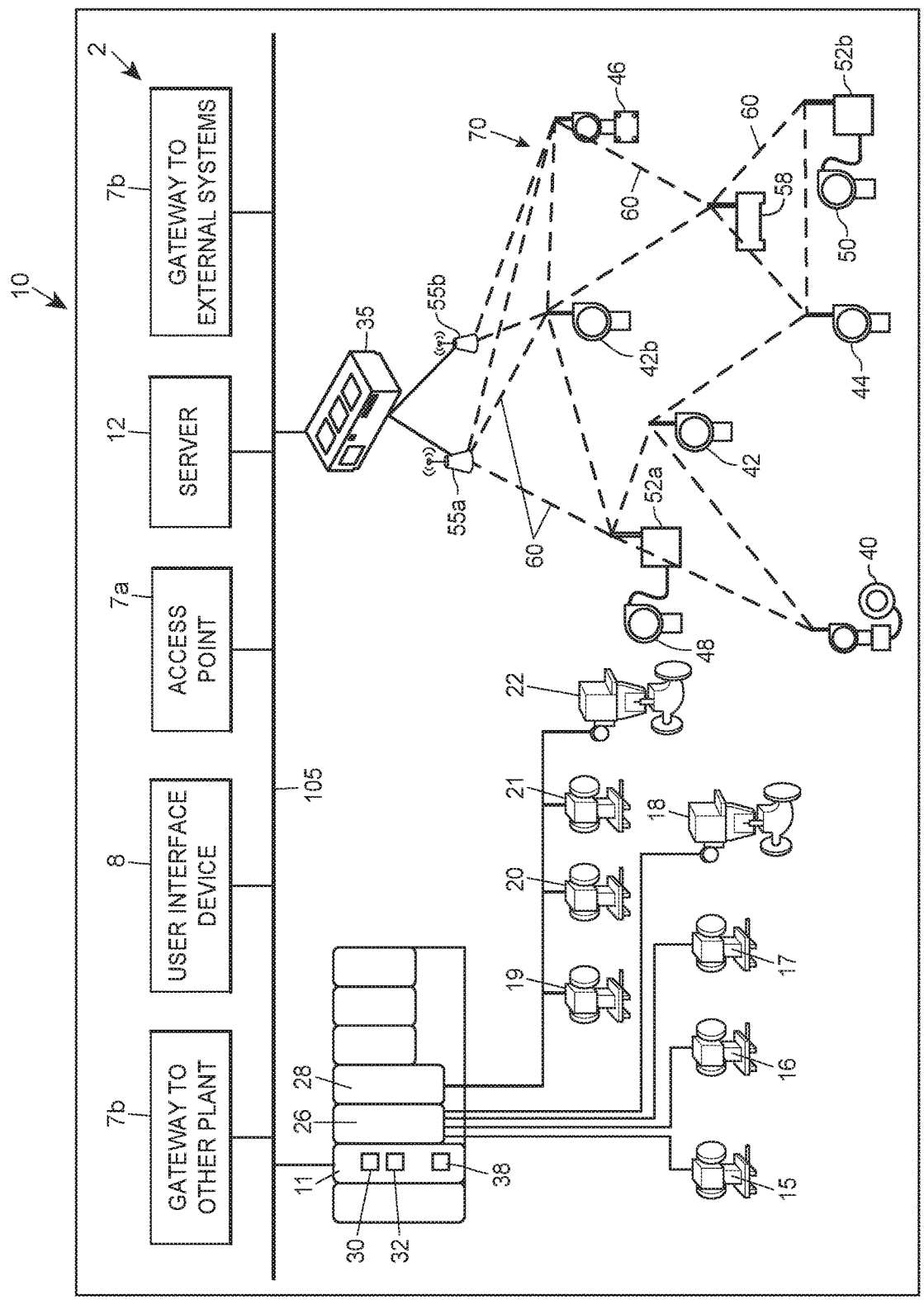
FIG. 1 is a block diagram of an example process plant or process control system, that illustrates, inter alia, interconnections between various example components of the process control system, the process control system itself, and other example systems and/or networks.

A distributed ledger is a storage mechanism for data, events, transactions, etc. that is maintained by several participants. More specifically, a distributed ledger is a way of achieving a distributed consensus on the validity or invalidity of information recorded in the distributed ledger. In other words, the distributed ledger provides a decentralized trust to participants and observers. As opposed to relying on a central authority, a distributed ledger is a decentralized database in which a transactional record of changes to the ledger is maintained and validated by each node of a peer-to-peer network. One type of distributed ledger, a blockchain, is comprised of groupings of transactions organized together into a "block," and ordered sequentially (thus the term "blockchain"). While the distributed ledgers discussed herein are referred to in the context of a blockchain, this is merely one example of a distributed ledger. Distributed ledgers may also include a tangle, a block lattice, or other directed acyclic graph (DAG). In any event, nodes may join and leave the blockchain network over time and may obtain blocks from peer nodes that were propagated while the node was gone. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. If all of the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and the change is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

A smart contract is a computer protocol that enables the automatic execution and/or enforcement of an agreement between different parties. In particular, the smart contract may be computer code that is located at a particular address on the blockchain. In some cases the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds that are stored at their address. In some scenarios when this balance reaches zero the smart contract may no longer be operational.

The smart contract may include one or more trigger conditions, that, when satisfied, correspond to one or more actions. For some smart contracts, the action(s) performed may be determined based upon one or more decision conditions. In some instances, data streams may be routed to the smart contract so that the smart contract may detect that a trigger condition has occurred and/or analyze a decision condition.

Blockchains may be deployed in a public, decentralized, and permissionless manner meaning that any party may view the distributed ledger, submit new information to be added to the ledger, or join the network as a validating node. Other blockchains are private (e.g., permissioned ledgers) that keep chain data private among a group of entities authorized to participate in the blockchain network. Other blockchain implementations may be both permissioned and permissionless whereby participants may need to be validated, but only the information that participants in the network wish to be public is made public.

In some implementations, a distributed ledger includes multiple blockchains such as a main blockchain and several side chains operating independently of the main blockchain. The side chains then interact with the main blockchain to provide some of the transaction data from the side chains to the main blockchain. In this manner, the side chains can be private while the main blockchain is public or available to a larger number of entities than the side chains. Non-sensitive information from the side chains may be shared on the main blockchain. Also in some implementations, a distributed ledger includes multiple layers or separate blockchains executing in parallel that are maintained by the same validating nodes. Some of the transaction data from the blockchain for the first layer may be provided to the blockchain for the second layer or vice versa.

In one example, a distributed ledger may be maintained by validating nodes which transmit data to remote systems using one or more public and/or private networks, such as a private enterprise network, the Internet, a cellular router, a backhaul Internet or other type backhaul connection. The validating nodes receive transactions broadcasted to the distributed ledger network by for example, storage centers. Other computing devices such as operator workstations, server devices, or other user interface devices in the process plant may also broadcast transactions to the distributed ledger network. The validating nodes then validate the broadcasted transactions. In some implementations, the storage centers are also validating nodes such that the storage centers broadcast transactions to the distributed ledger network and validate broadcasted transactions.

FIG. 1 is a block diagram of an example process plant 10 which may utilize any one or more of the novel distributed ledger techniques described herein. The process plant 10 (which is also interchangeably referred to herein as a process control system 10 or process control environment 10) includes one or more process controllers that receive signals indicative of process measurements made by field devices, process this information to implement a control routine, and generate control signals that are sent over wired or wireless process control communication links or networks to other field devices to control the operation of a process in the plant 10. Typically, at least one field device performs a physical function (e.g., opening or closing a valve, increasing or decreasing a temperature, taking a measurement, sensing a condition, etc.) to control the operation of a process. Some types of field devices communicate with controllers by using I/O devices. Process controllers, field devices, and I/O devices may be wired or wireless, and any number and combination of wired and wireless process controllers, field devices and I/O devices may be included in the process plant environment or system 10.

For example, FIG. 1 illustrates a process controller 11 that is communicatively connected to wired field devices 15-22 via input/output (I/O) cards 26 and 28, and that is communicatively connected to wireless field devices 40-46 via a wireless gateway 35 and a process control data highway or backbone 105. The process control data highway 105 may include one or more wired and/or wireless communication links, and may be implemented using any desired or suitable or communication protocol such as, for example, an Ethernet protocol. In some configurations (not shown), the controller 11 may be communicatively connected to the wireless gateway 35 using one or more communications networks other than the backbone 105, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV™ controller sold by Emerson Process Management, may operate to implement a batch process or a continuous process using at least some of the field devices 15-22 and 40-46. In an embodiment, in addition to being communicatively connected to the process control data highway 105, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other nodes communicatively connected to the controller 11. It should be noted that any control routines or modules described herein may have parts thereof implemented or executed by different controllers or other devices if so desired. Likewise, the control routines or modules 38 described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

The controller 11 implements a control strategy using what are commonly referred to as function blocks, where each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops which are performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the I/O cards 26, 28 additionally or alternatively communicate with the controller 11 using the process control data highway 105 and/or by using other suitable control system protocols (e.g., Profibus, DeviceNet, Foundation Fieldbus, ControlNet, Modbus, HART, etc.).

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 105 or to another process control communications network. The wireless gateway 35 provides access to various wireless devices 40-58 of the wireless communications network 70. In particular, the wireless gateway 35 provides communicative coupling between the wireless devices 40-58, the wired devices 15-28, and/or other nodes or devices of the process control plant 10. For example, the wireless gateway 35 may provide communicative coupling by using the process control data highway 105 and/or by using one or more other communications networks of the process plant 10.

Similar to the wired field devices 15-22, the wireless field devices 40-16 of the wireless network 70 perform physical control functions within the process plant 10, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 10, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52A, 52B. The wireless adaptors 52A, 52B support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55A, 55B, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 105.

In FIG. 1, the process control system 10 includes one or more operator workstations or user interface devices 8 that are communicatively connected to the data highway 105. Via the operator workstations 8, operators may view and monitor run-time operations of the process plant 10, as well as take any diagnostic, corrective, maintenance, and/or other actions that may be required. At least some of the operator workstations 8 may be located at various, protected areas in or near the plant 10, and in some situations, at least some of the operator workstations 8 may be remotely located, but nonetheless in communicative connection with the plant 10. Operator workstations 8 may be wired or wireless computing devices.

The example process control system 10 may further include a configuration application (not shown) and configuration database (not shown), each of which is also communicatively connected to the data highway 105. As discussed above, various instances of the configuration application (not shown) may execute on one or more user interface devices 8 to enable users to create or change process control modules and download these modules via the data highway 105 to the controllers 11, as well as enable users to create or change operator interfaces via which an operator is able to view data and change data settings within process control routines. The configuration database (not shown) stores the created (e.g., configured) modules and/or operator interfaces.

In some configurations, the process control system 10 includes one or more other wireless access points 7a that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 7a allow handheld or other portable computing devices to communicate over a respective wireless process control communication network that is different from the wireless network 70 and that supports a different wireless protocol than the wireless network 70. For example, a wireless or portable user interface device 8 may be a mobile workstation or diagnostic test equipment that is utilized by an operator within the process plant 10. In some scenarios, in addition to portable computing devices, one or more process control devices (e.g., controller 11, field devices 15-22, or wireless devices 35, 40-58) also communicate using the wireless protocol supported by the access points 7a.

In some configurations, the process control system 10 includes one or more gateways 7b, 7c to systems that are external to the immediate process control system 10 (also referred to herein as "edge gateway" and described in more detail below). Typically, such systems are customers or suppliers of information generated or operated on by the process control system 10. For example, the process control plant 10 may include a gateway node 7b to communicatively connect the immediate process plant 10 with another process plant. Additionally or alternatively, the process control plant 10 may include a gateway node 7c to communicatively connect the immediate process plant 10 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates a single controller 11 with a finite number of field devices 15-22 and 40-46, wireless gateways 35, wireless adaptors 52, access points 55, routers 58, and wireless process control communications networks 70 included in the example process plant 10, this is only an illustrative and non-limiting embodiment. Any number of controllers 11 may be included in the process control plant or system 10, and any of the controllers 11 may communicate with any number of wired or wireless devices and networks 15-22, 40-46, 35, 52, 55, 58 and 70 to control a process in the plant 10.

Further, it is noted that the process plant or control system 10 of FIG. 1 includes a field environment (e.g., "the process plant floor") and a back-end environment (e.g., servers 12) which are communicatively connected by the data highway 105. As shown in FIG. 1, the field environment includes physical components (e.g., process control devices, networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58 and 70 are located, disposed, or otherwise included in the field environment of the process plant 10. Generally speaking, in the field environment of the process plant 10, raw materials are received and processed using the physical components disposed therein to generate one or more products.

The back-end environment of the process plant 10 includes various components such as server computing devices 12, operator workstations 8, databases or databanks, etc. that are shielded and/or protected from the harsh conditions and materials of the field environment. Referring to FIG. 1, the back-end environment includes, for example, the operator workstations 8, server computing devices 12, and/or functionality that support the run-time operations of the process plant 10. In some configurations, various computing devices, databases, and other components and equipment included in the back-end environment of the process plant 10 may be physically located at different physical locations, some of which may be local to the process plant 10, and some of which may be remote.

Figure 2:
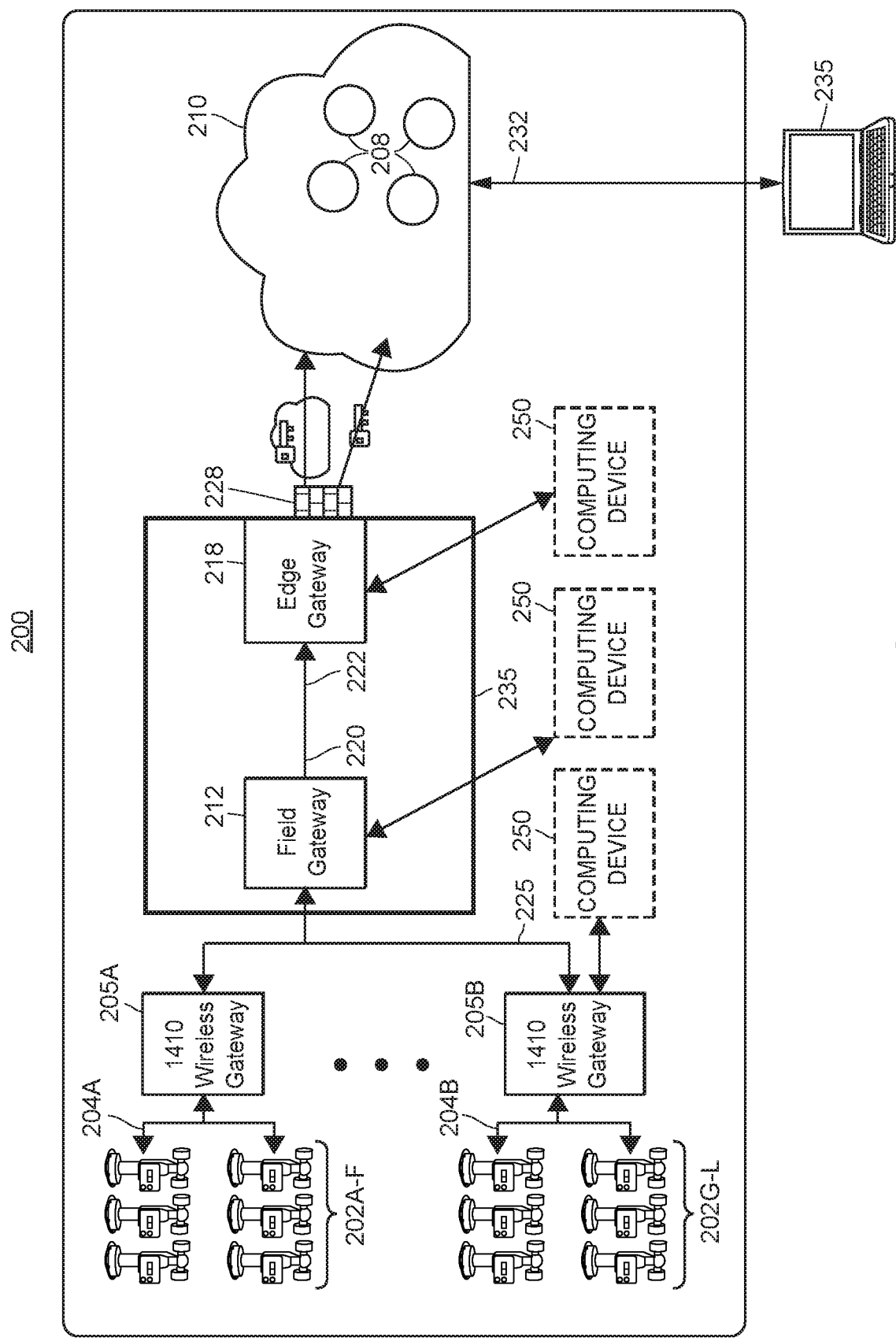
FIG. 2 is a block diagram of an example security architecture for a process plant or process control system.

FIG. 2 includes a block diagram of an example security architecture 200 for the process plant 10. As shown in FIG. 2, one or more devices 202 are communicatively connected to one or more wireless gateways 205A, 205B which, for example, may be instances of the wireless gateway 35 of FIG. 1. The communicative connections between the gateways 205A, 205B and the devices 202 are denoted by the references 204A, 204B.

The set of devices 202 is depicted as comprising a finite number of wireless field devices. However, it is understood that the concepts and features described herein with respect to the devices 202 may be easily applied to any number of field devices of the process plant 10, as well as to any types of field devices. For example, the field devices 202 may include one or more wired field devices 15-22 that are communicatively connected to the wireless gateways 205A, 205B via one or more wired communication networks of the process plant 10, and/or the field devices 202 may include wired field devices 48, 50 that are coupled to wireless adaptors 52A, 52B.

Further, it is understood that the set of devices 202 is not limited to only field devices, but may additionally or alternatively include any device or component within the process plant 10 that generates data as a result of the process plant 10 controlling the on-line process. For example, the set of devices 202 may include a diagnostic device or component that generates diagnostic data, a network routing device or component that transmits information between various components of the process plant 10, and the like. Indeed, any of the components shown in FIG. 1 (e.g., components 7a-7c, 8, 11, 12, 15-22, 26, 28, 35, 40-46, 52, 55, 58, 60, and 70) and other components that are not shown may be a device that generates data for delivery to the storage centers 210. As such, the set of devices 202 is referred to interchangeably herein as "data sources 202" or "data source devices 202."

FIG. 2 further illustrates a set of remote applications or services 208 that may be utilized for the process plant 10 and/or that the process plant 10 utilizes. The set of remote applications or services 208 may execute or be hosted at one or more remote systems. More specifically, the remote systems may include storage centers 210 which store the data generated at the process plant 10. The remote systems may also include data subscribers which retrieve the data and execute the remote applications 208. At least some of the applications or services 208 operate in real-time on real-time data as the real-time data is generated by the process plant 10 and received by the applications or services 208. Other applications or services 208 may operate or execute on process plant-generated data with less stringent timing requirements. Examples of applications/services 208 that may execute or be hosted at the remote system and that are consumers of data generated by the process plant 10 include applications that monitor and/or sense conditions and/or events occurring at the process plant 10, and applications or services that monitor at least a portion of the on-line process itself as it is executing at the process plant 10. Other examples of applications/services 208 include descriptive and/or prescriptive analytics, which may operate on data generated by the process plant 10 and, in some cases, may operate on knowledge gleaned or discovered from analyzing the process plant-generated data, as well as on data generated by and received from other process plants. Still other examples of applications/services 208 include one or more routines that implement prescriptive functions and/or changes that are to be implemented back into the process plant 10, e.g., as a result of another service or application. Other examples of applications and services 208 operate on knowledge gleaned from analyzing historical data generated by the process plant and/or other process plants or from comparing data for a process plant entity to data process plant entities of a same or similar type.

The storage centers 210 may be implemented in any desired manner, such as by a remote bank of networked servers, cloud computing systems, networks, etc. including storage center computing devices.

Generally speaking, the security architecture 200 provides end-to-end security from the field environment of the process plant 10 in which devices 202 are installed and operate, to the remote system providing applications and/or services 208 that consume and operate on the data generated by the process plant 10. As such, data that is generated by the devices 202 and other components of the process plant 10 is able to be securely transported to the remote system including the storage centers 210 for use by the remote applications/services 208 while protecting the plant 10 from cyber attacks, intrusions, and/or other malicious events. In particular, the security architecture 200 includes a field gateway 212, and an edge gateway 218 disposed between the process plant 10 (e.g., between the wireless gateways 205A, 205B of the process plant 10) and the storage centers 210.

Data that is egressed from the process plant 10 and transmitted from the input port 220 to the output port 222 may be further secured by encryption. In an example, the field gateway 212 encrypts data and delivers encrypted data to the input port 220. The data traffic that is encrypted and transported may be UDP (User Datagram Protocol) data traffic, in an example, and may be JSON data traffic or some other general purpose communication format, in another example.

The field gateway 212 communicatively connects to the process control plant 10. As shown in FIG. 2, the field gateway 212 is communicatively connected to the wireless gateways 205A, 205B that are disposed within the field environment of the process plant 10, and that are communicatively connected to one or more devices or data sources 202. As previously discussed, the devices or data sources 202 and the wireless gateways 205A, 205B may communicate using the WirelessHART industrial protocol or other suitable wireless protocol that is structured to provide secured communications via one or more security mechanisms. For instance, the WirelessHART industrial protocol provides 128-bit AES encryption, and the communication paths 204A, 204B may be secured accordingly.

Additionally, the communicative connection 225 between the wireless gateways 205A, 205B and the field gateway 212 is respectively secured using the same or a different security mechanism as utilized for the communicative connections 204A, 204B. In an example, the communicative connection 225 is secured by a TLS (Transport Layer Security) wrapper. For instance, the wireless gateways 205A, 205B generate packets in the HART-IP format which are secured by a TLS wrapper for transit to the field gateway 212.

Thus, as described above, in an embodiment, data or packets generated by the devices 202 may be secured for transit 204A, 204B to the wireless gateways 205A, 205B using a first security mechanism, and subsequently secured for transit 225 from the wireless gateways 205A, 205B to the field gateway 212 using a second security mechanism, and still subsequently secured for transit to the edge gateway 218 using a third security mechanism. Additionally or alternatively, and as depicted in FIG. 2, the edge gateway 218 may be protected by a firewall 228.

Data transiting from the edge gateway 218 to the storage centers 210 may be delivered using one or more public and/or private networks, such as a private enterprise network, the Internet, a cellular router, a backhaul Internet or other type backhaul connection. Significantly, the data transiting from the edge gateway 218 to the storage centers 210 is secured by using a fourth security mechanism. More specifically, each set or subset of data traffic delivered from the edge gateway 218 to the storage centers 210 may be encrypted with a cryptographic key. In some implementations, the cryptographic key is a one-time cryptographic key or one-time pad which is used once to encrypt the set or subset of data. The storage centers 210 may not have access to the one-time pad. Instead, the storage centers 210 store the encrypted data sets or subsets. When a data subscriber requests a particular data set generated by the process plant 10 or another data contributor, the edge gateway 218 for example, provides the one-time pad to the data subscriber to decrypt the encrypted data set or subset which the data subscriber retrieves from the storage center.

In some implementations, at the storage centers 210, security is provided via a domain authentication service 232. As such, only user interface devices 235 such as data subscriber computing devices that are authenticated and authorized via the domain authentication service 232 are able gain access to at least some of the data that is available at the storage centers 210, which includes, inter alia, the data generated by the devices 202.

Thus, as described above, the security architecture 200 provides end-to-end security for data generated by devices or data sources 202 while operating in the process plant 10 to control a process, e.g., from the data's inception by the data sources 202 through its transmission to the storage centers 210 to be operated on by one or more remote applications or services 208. Importantly, the security architecture 200 provides this end-to-end security while preventing malicious attacks from being incurred on the process plant 10.

It is noted that although FIG. 2 depicts wireless gateways 205A, 205B as communicatively connecting the devices or data sources 202 to the field gateway 212, in some arrangements one or more of the wireless gateways 205A, 205B are omitted and source data is transmitted from the data sources 202 directly to the field gateway 212. For example, the data sources 202 may transmit source data directly to the field gateway 212 via a big data network of the process plant 10. Generally speaking, a big data network of the process plant 10 is not the backbone plant network 105, nor is the big data network an industrial protocol network used to transmit control signals between devices using an industrial communication protocol (e.g., Profibus, DeviceNet, Foundation Fieldbus, ControlNet, Modbus, HART, etc.). Rather, a big data network of the process plant 10 may be an overlay network implemented for the process plant 10 that streams data between nodes for data processing and analytics purposes, for example. The nodes of a big data network may include, for example, the data sources 202, the wireless gateways 205A, 205B, and the field gateway 212, as well as any one or more of the components 7a-7c, 8, 11, 12, 15-22, 26, 28, 35, 40-46, 52, 55, 58, 60, and 70 shown in FIG. 1 and other components. Accordingly, for many nodes of a process plant data network include, respectively, a designated interface for process plant operations that typically utilizes an industrial communication protocol, and another designated interface for data processing/analytics operations that may utilize a streaming protocol, for instance.

It is further noted with respect to FIG. 2 that in some embodiments, a wired gateway (not shown) may be utilized in lieu of one of the wireless gateways 205A, 205B. Still further, the field gateway 212 and the edge gateway 218 may be physically co-located, such as indicated by the box 235 shown in FIG. 2, or the components 212 and 218 may be physically located across multiple locations. For example, one or more of the field gateway 212 or the edge gateway 218 may be disposed at the process plant 10. Additionally or alternatively, one or more of the field gateway 212 or the edge gateway 218 may be disposed remotely from the process plant 10.

The process plant 10 may be serviced by more than one field gateway 212, if desired, and any number of field gateways 212 may be serviced by a single edge gateway

218. In some embodiments, the storage centers 210 are serviced by more than one edge gateway 218, if desired.

Distributed Ledger Architecture in a Process Control System

Figure 3:
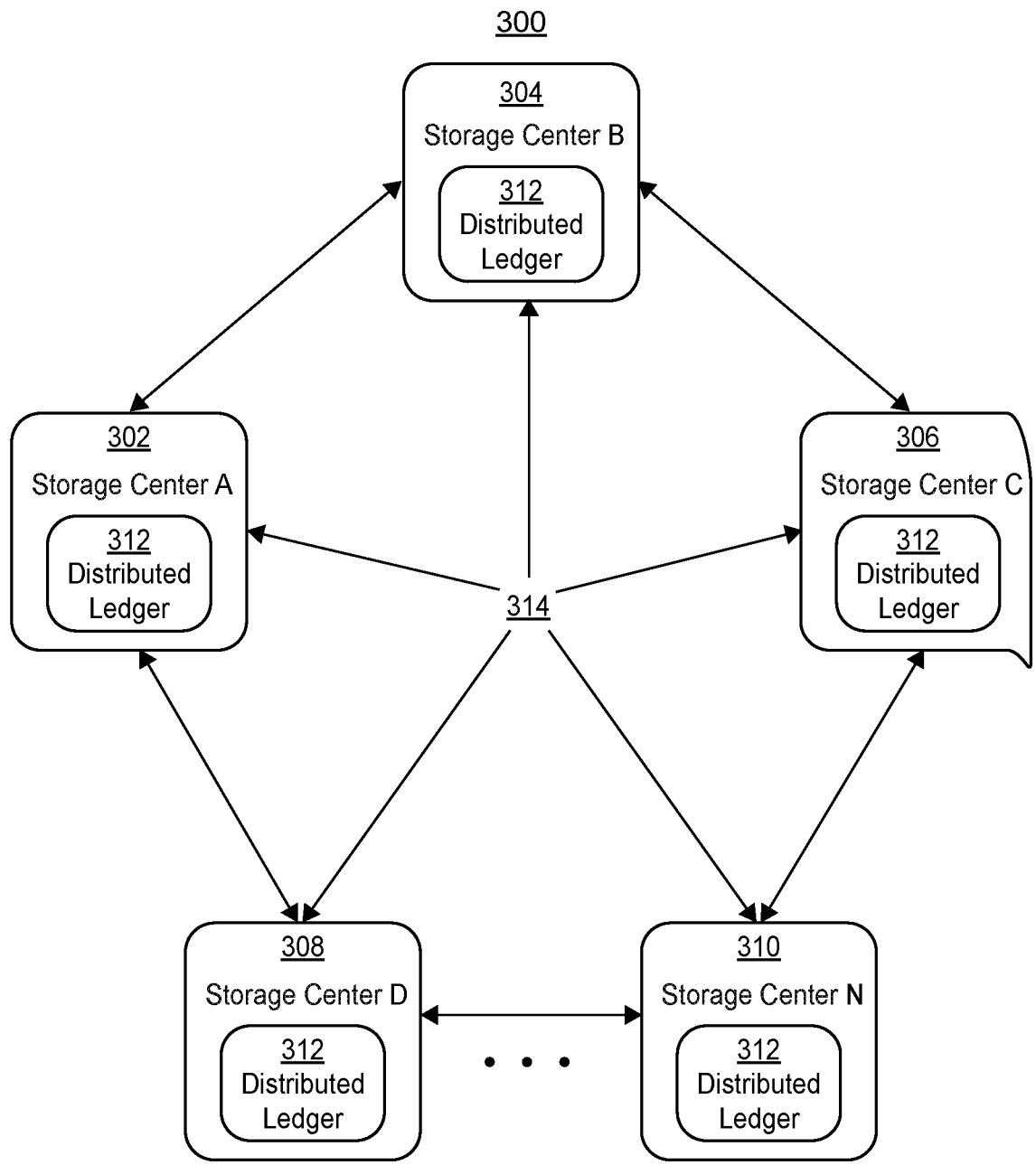
FIG. 3 is an exemplary distributed ledger system for recording transactions and executing smart contracts in a process control system.

While FIG. 2 illustrates a storage center 210, several storage centers 210 may be included each acting as a validating node in a distributed ledger network. FIG. 3 depicts an exemplary distributed ledger system 300 for recording storage operations related to encrypted measurement data. The encrypted measurement data may include process parameter data, product parameter data, configuration data, user interaction data, maintenance data, commissioning data, plant network data, product tracking data, event data related to events in the process plant 10 such as alarms, leaks, failures, errors, etc., or any other suitable data generated in or related to one or several process plants. The encrypted measurement data may also include data generated by hospitals, or any other suitable data contributors.

The system 300 includes a distributed ledger 312 and a plurality of nodes 302, 304, 306, 308, and 310, which may be storage centers such as the storage centers 210, or may be any suitable computing devices operating in the process plant 10 or communicating with devices operating in the process plant 10. Each node maintains a copy of the distributed ledger 312. As changes are made to the distributed ledger 312, each node receives the change via the network 314 and updates its respective copy of the distributed ledger 312. A consensus mechanism may be used by the nodes 302-310 in the distributed ledger system 300 to decide whether it is appropriate to make received changes to the distributed ledger 312.

Each node in the system therefore has its own copy of the distributed ledger 312, which is identical to every other copy of the distributed ledger 312 stored by the other nodes. The distributed ledger system 300 may be more robust than a central authority database system because of the distributed ledger's decentralized nature. As such, there is no single point of failure on the distributed ledger system 300 as there would be in a centralized system.

Figure 4:
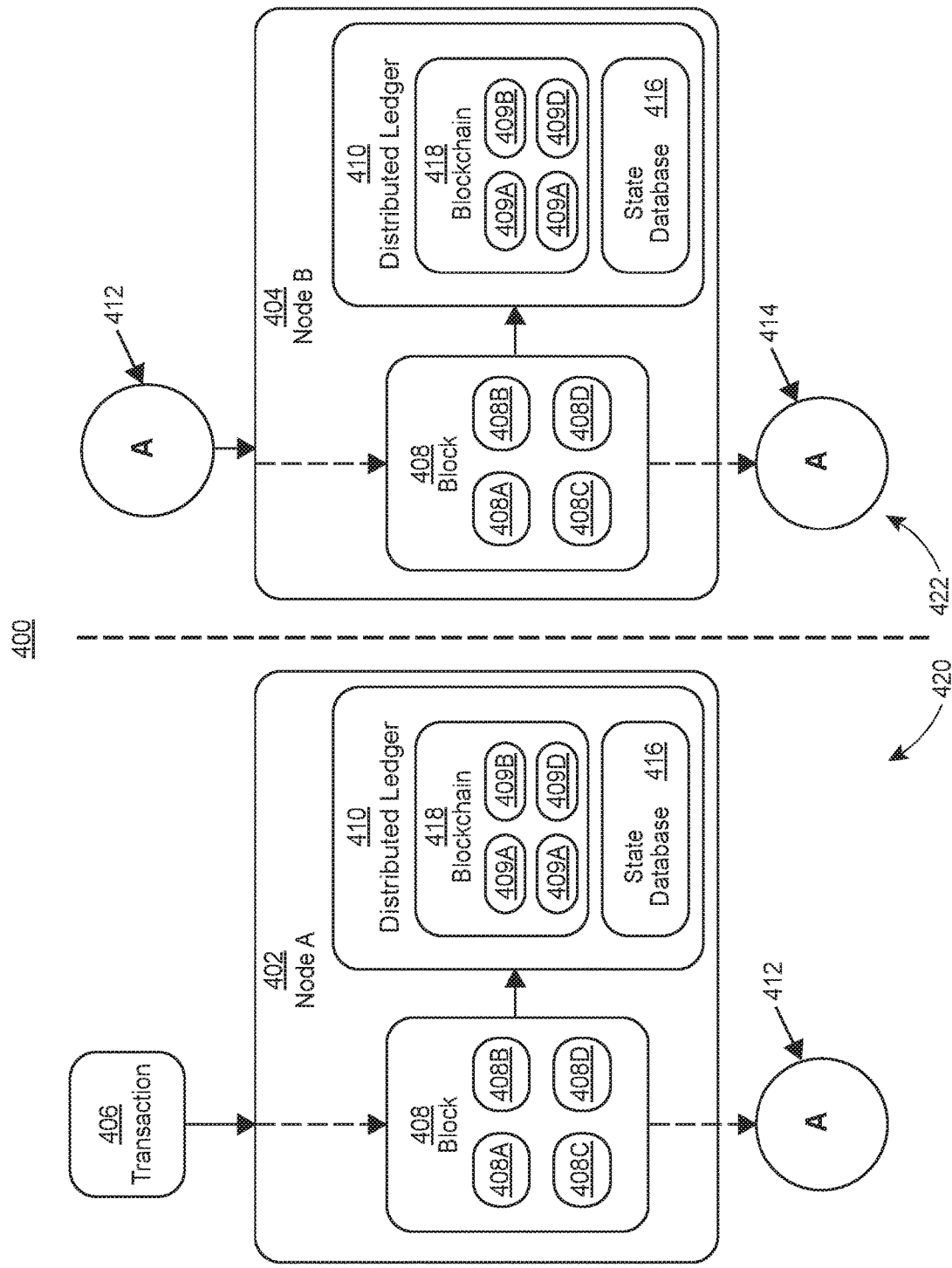
FIG. 4 illustrates exemplary validating network nodes and an exemplary transaction flow on a distributed ledger network in a process control system.

FIG. 4 depicts exemplary validating network nodes and an exemplary transaction flow 400 on a distributed ledger network for resolving transactions. FIG. 4 includes two time frames 420 and 422 represented by the left and right sides of the dotted line, respectively, Node A 402 and Node B 404 (which may be two storage centers), a set of transactions 408A-408D, a set of blocks of transactions 409A-409D, a distributed ledger 410, and a blockchain 418.

The block propagation flow 400 may begin with Node A 402 receiving transaction 406 at time 420. When Node A 402 confirms that transaction 406 is valid, Node A 402 may add the transaction to a newly generated block 408. As part of adding the transaction 406 to block 408, Node A 402 may solve a cryptographic puzzle and include the solution in the newly generated block 408 as proof of the work done to generate the block 408. Alternatively, a proof of stake algorithm may be used to generate the block 408, whereby Node A 402 "stakes" an amount of a digital token used on the network, however, the network itself determines the node that will mint the new block. In other embodiments, the transaction 406 may be added to a pool of transactions until a sufficient number of transactions in the pool exist to form a block. Node A 402 may transmit the newly created block 408 to the network at time 412. Before or after propagating the block 408, Node A 402 may add the block 408 to its copy of the blockchain 418.

While proof of work and proof of stake are described herein as consensus algorithms for selecting a node to mint a new block, these are merely a few example consensus algorithms and are not intended to be limiting. Additional consensus algorithms may be utilized, such as delegated proof of stake where nodes elect a subset of nodes referred to as delegates to perform validation, and the delegates take turns minting new blocks. Consensus algorithms may also include proof of authority, proof of weight, Byzantine fault tolerance, tangle consensus algorithms, block lattice consensus algorithms, etc.

In any event, the transactions 409A-409D may include updates to a state database 416. The state database 416 may contain current values of variables created by smart contracts deployed on the blockchain 418. Validated blocks, such as block 408, may include transactions effecting state variables in state database 416. At time 422, Node B 404 may receive the newly created block 408 via the network at 412. Node B 404 may verify that the block of transactions 408 is valid by checking the solution to the cryptographic puzzle provided in the block 408. If the solution is accurate, then Node B 404 may add the block 408 to its blockchain 418 and make any updates to the state database 416 as rejected by the transactions in block 408. Node B 404 may then transmit the block 408 to the rest of the network at time 314.

Figure 5:
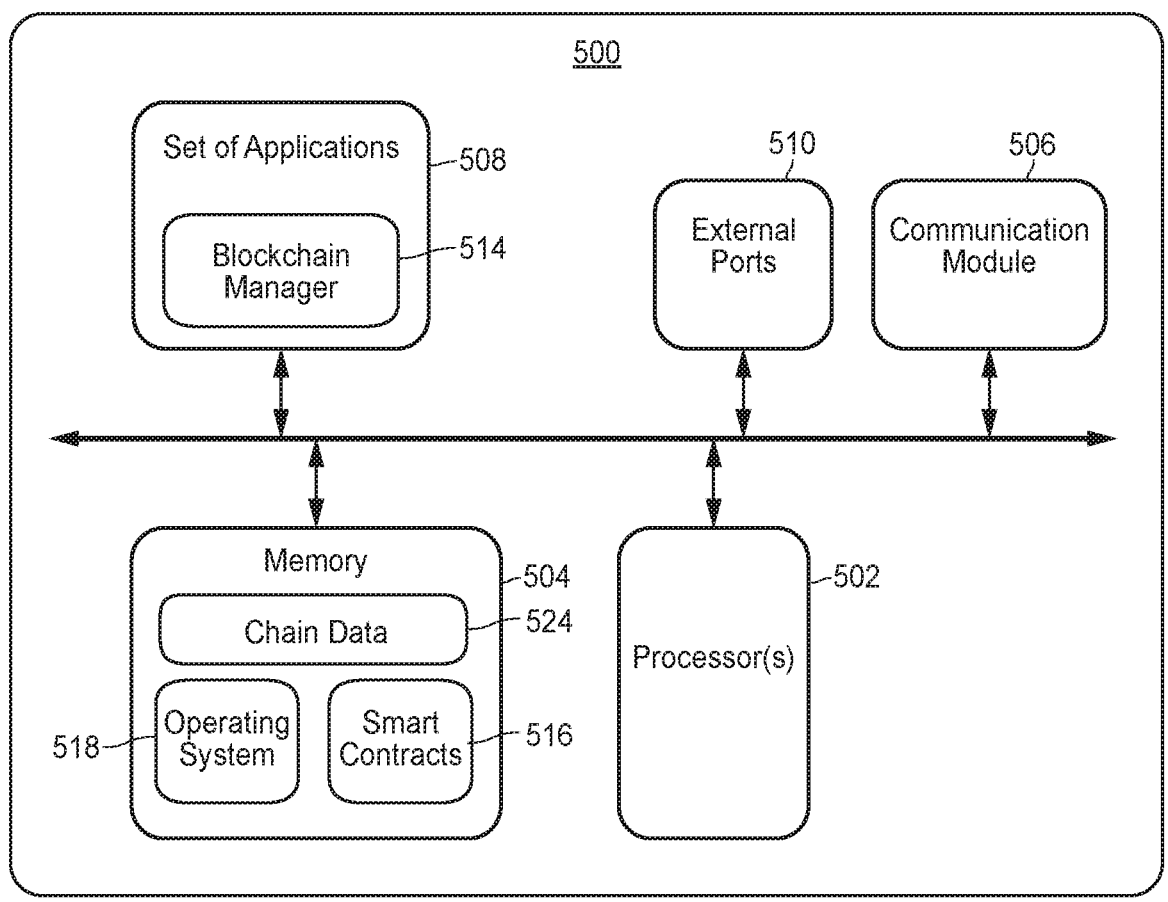
FIG. 5 illustrates exemplary components of a network node on a distributed ledger network in a process control system.

FIG. 5 depicts exemplary components of a validating network node 500 on a distributed ledger network for recording storage of encrypted measurement data. Node 500 may include at least one processor 502, memory 504, a communication module 506, a set of applications 508, external ports 510, a blockchain manager 514, smart contracts 516, and an operating system 518. In some embodiments, the node 500 may generate a new block of transactions, or may broadcast transactions to other network nodes by using the blockchain manager 514. Similarly, the node 500 may use the blockchain manager 514 in conjunction with the smart contracts 516 stored in the memory 504 to execute the functionality disclosed herein. The memory 504 may further include chain data 524 including, for example, a state database of the blockchain for storing states of smart contracts deployed thereon.

In other embodiments, the smart contracts 516 operate independent of the blockchain manager 514 or other applications. In some embodiments, the node 500 does not have a blockchain manager 514, or smart contracts 516 stored at the node. In some embodiments, the node 500 may have additional or fewer components than described. The components of the node 500 are described in more detail below.

The node 500, as part of a decentralized ledger system 300, or another decentralized or centralized network, may be used as part of systems that interact with and/or manipulate transactions associated with data or events occurring in one or several process plants.

Figure 6:
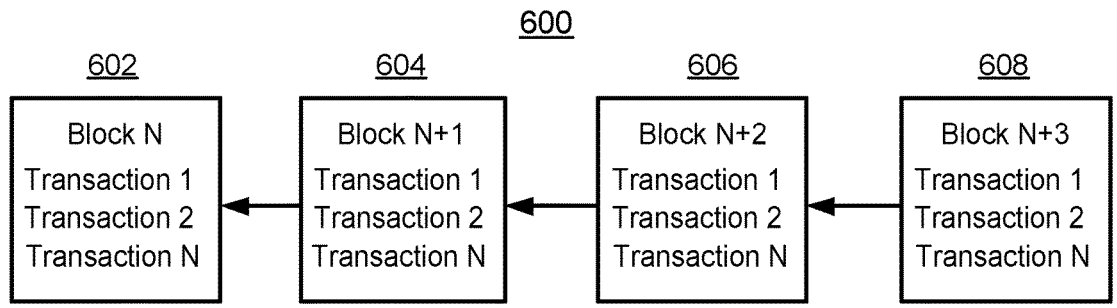
FIG. 6 illustrates an example distributed ledger including a blockchain having blocks of transactions in a process control system.

FIG. 6 depicts an exemplary distributed ledger 600 including a blockchain having blocks 602-608 of transactions in a process control system. In some embodiments, the blockchain 600 includes several blocks 602-608 connected together to form a chain of blocks 602-608 of transactions. To cryptographically link blocks and transactions together, each block in the blockchain 600 organizes its transactions into a Merkle Tree. In a Merkle Tree each transaction is hashed according to a cryptographic hashing algorithm (e.g., SHA-256) and the resulting output hash is then combined with the hash of another transaction. Then the combined result is also hashed according to the cryptographic hashing algorithm. This output is then combined with the hash of two other transactions and this process is repeated until all of the transactions in the block are combined and hashed to generate a Merkle root that is used in the header for a block 602-608. If any single transaction in the block is tampered with, a different Merkle root would be generated since the Merkle root is a combination of the hashes of all of the transactions in the block.

In other words, the transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the node at the top of the tree or Merkle root, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

To verify that a block is valid, a node may compare the Merkle root of the block to the Merkle root for the same block included in other nodes' copies of the blockchain. Thus, the Merkle root can be used as proof of the transactions included in the block and as proof that the contents of the block have not been tampered with if the Merkle root is the same in each node's copy of the block.

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. For example, storage operations regarding encrypted measurement data such as process parameter data or product parameter data may be uploaded to the blockchain 600 as the encrypted measurement data is stored at a storage center 210. Only a cryptographic hash of the encrypted measurement data may be included in the blockchain 600, such that the encrypted measurement data may be verified using the blockchain even if it is obtained by a party off-chain, such as a data subscriber.

Validating network nodes may verify that the signed transaction or signed message was signed by the private cryptographic key corresponding to the published public cryptographic key owned by the storage center 210 storing the encrypted measurement data. In at least one implementation, a valid proof-of-identity may be applied as a consensus rule by the blockchain network. As such, any transaction attempting to add new storage operation data without a cryptographic proof-of-identity matching an identity authorized to add new storage operation data is rejected by the network as non-compliant with the consensus rule. Each storage center 210 may be assigned a public key/private key pair which is identified in the blockchain network as corresponding to the storage center 210. If the validating network nodes receive a transaction regarding storage operation data that is not from an authorized storage center 210, the validating network nodes reject the transaction.

Secure Storage System Using A Distributed Ledger

As described above, the process plant 10 or another data contributor generates and encrypts measurement data prior to transmitting the encrypted measurement data to a storage center 210. For example, as shown in FIG. 2, the field devices 202 generate measurement data which is provided to the edge gateway 218 via the field gateway 212. The edge gateway then encrypts the measurement data using a cryptographic key, such as a one-time pad for example. In some implementations, the data contributor generates sets of measurement data and divides each set of measurement data into subsets. The data contributor then encrypts each subset and sends the encrypted subsets to different storage centers 210.

Figure 7:
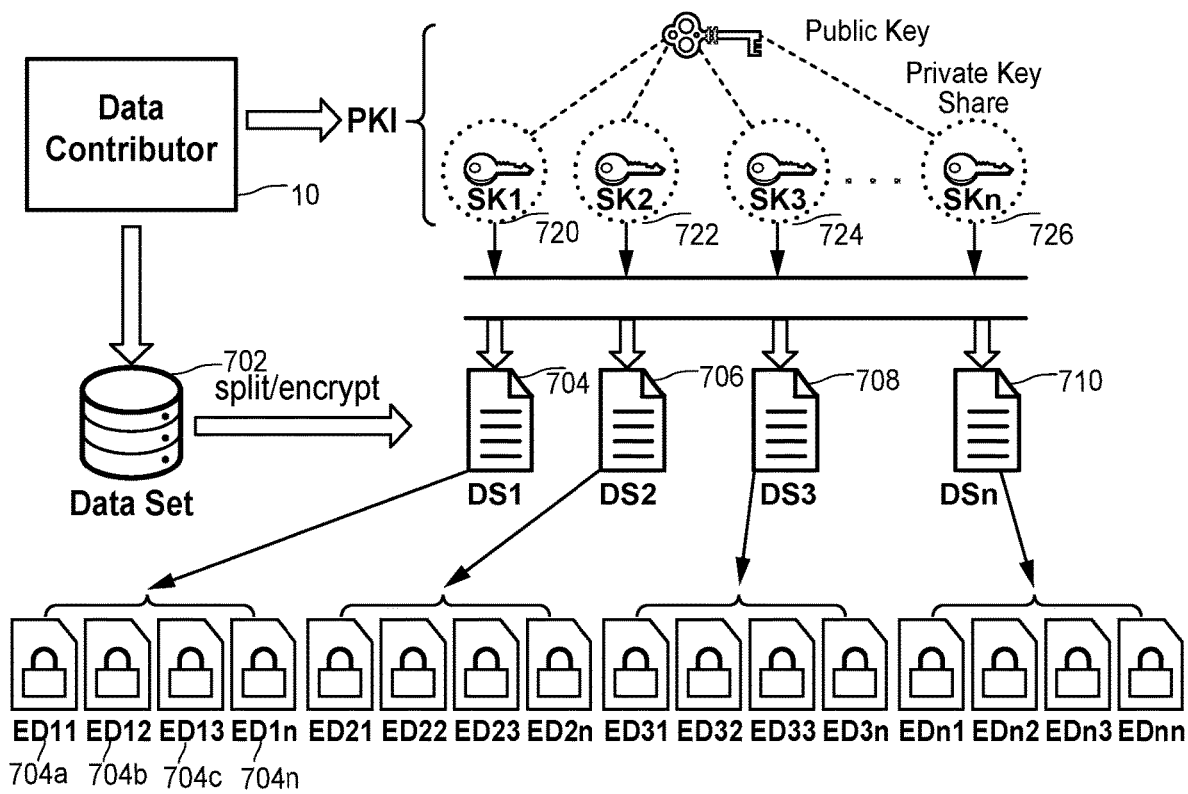
FIG. 7 illustrates example encryption and division techniques performed by a data contributor on a set of measurement data.

FIG. 7 depicts example encryption and division techniques performed by a data contributor, such as a process plant 10 on a set of measurement data. The data contributor 10 generates sets of measurement data 702 including a first data set 704 (DS1), a second data set 706 (DS2), a third data set 708 (DS3), and an nth data set 710 (DSn). The data contributor 10 divides each data set 704-710 into several subsets. For example, the data contributor 10 divides the first data set 704 into a first subset 704a (ED11), a second subset 704b (ED12), a third subset 704c (ED13), and an nth subset 704n (ED1n). The data contributor 10 also encrypts each subset of measurement data using a different secret key 720-726 (SK1, SK2, SK3, SKn). In some implementations, the secret keys are one-time cryptographic keys used once to encrypt the corresponding subset of measurement data. Then when a data subscriber requests at least some of the measurement data that includes a particular subset, the data contributor 10 provides the one-time cryptographic key used to encrypt the particular subset to the data subscriber for decrypting the particular subset. That one-time cryptographic key may not be used to decrypt any other subset or set of measurement data.

Figure 8:
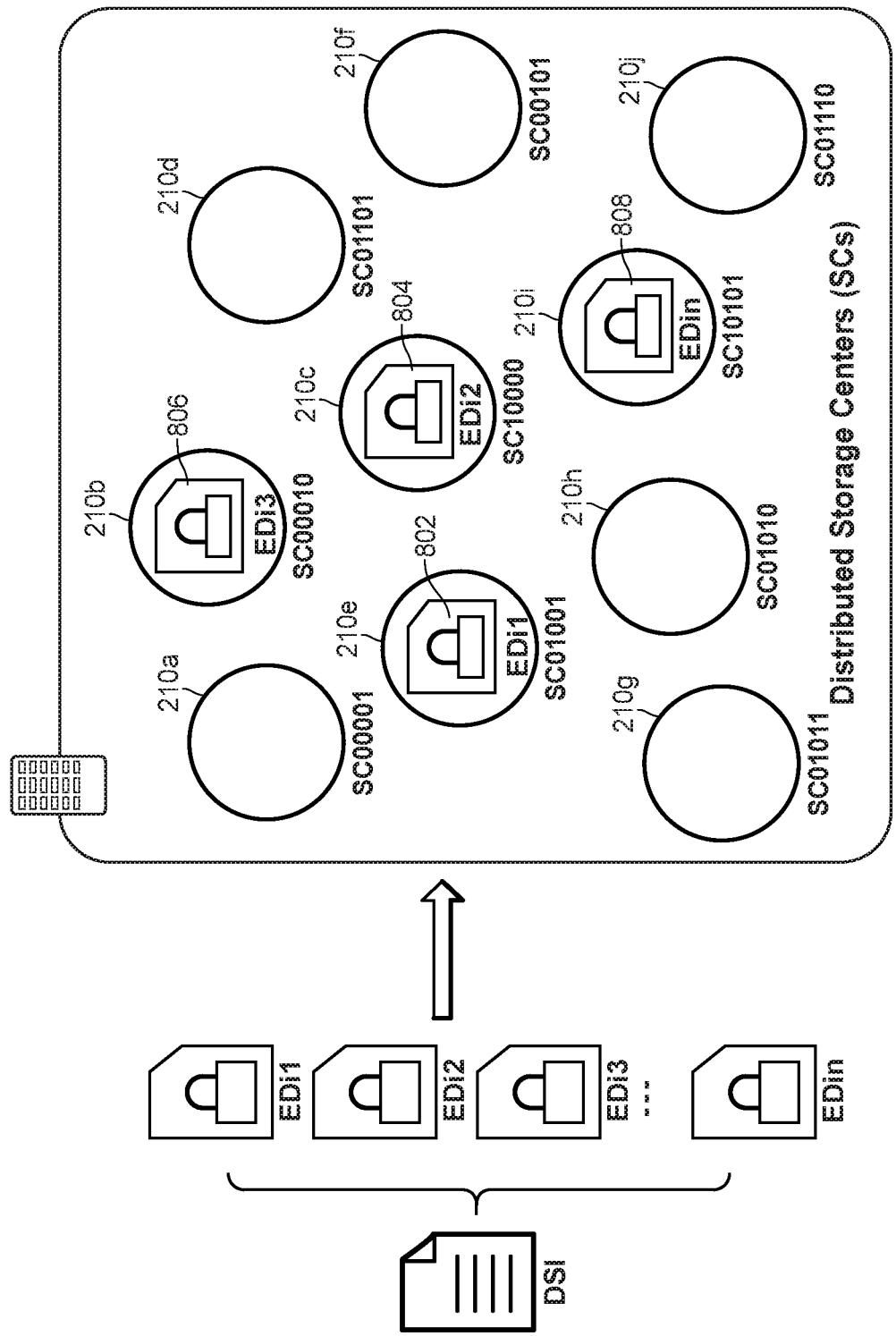
FIG. 8 illustrates a block diagram of example storage centers and corresponding measurement data sets or subsets stored at the storage centers.

The encrypted subsets of measurement data are then stored at different storage centers 210. This is depicted in FIG. 8 which illustrates several storage centers 210a-210j, including SC00001 (ref no. 210a), SC00010 (ref. no. 210b), SC10000 (ref no. 210c), SC01101 (ref. no. 210d), SC01001 (ref. no. 210e), SC00101 (ref no. 210f), SC01011 (ref no. 210g), SC01010 (ref no. 210h), SC10101 (ref. no. 210i), and SC01110 (ref. no. 210j). A first subset of an ith set of encrypted measurement data 802 (EDi1) is stored in SC01001 (ref. no. 210e), a second subset of the ith set of encrypted measurement data 804 (EDi2) is stored in SC10000 (ref. no. 210c), a third subset of the ith set of encrypted measurement data 806 (EDi3) is stored in SC00010 (ref no. 210b), and an nth subset of the ith set of encrypted measurement data 808 (EDin) is stored in SC10101 (ref no. 210i).

Figure 9:
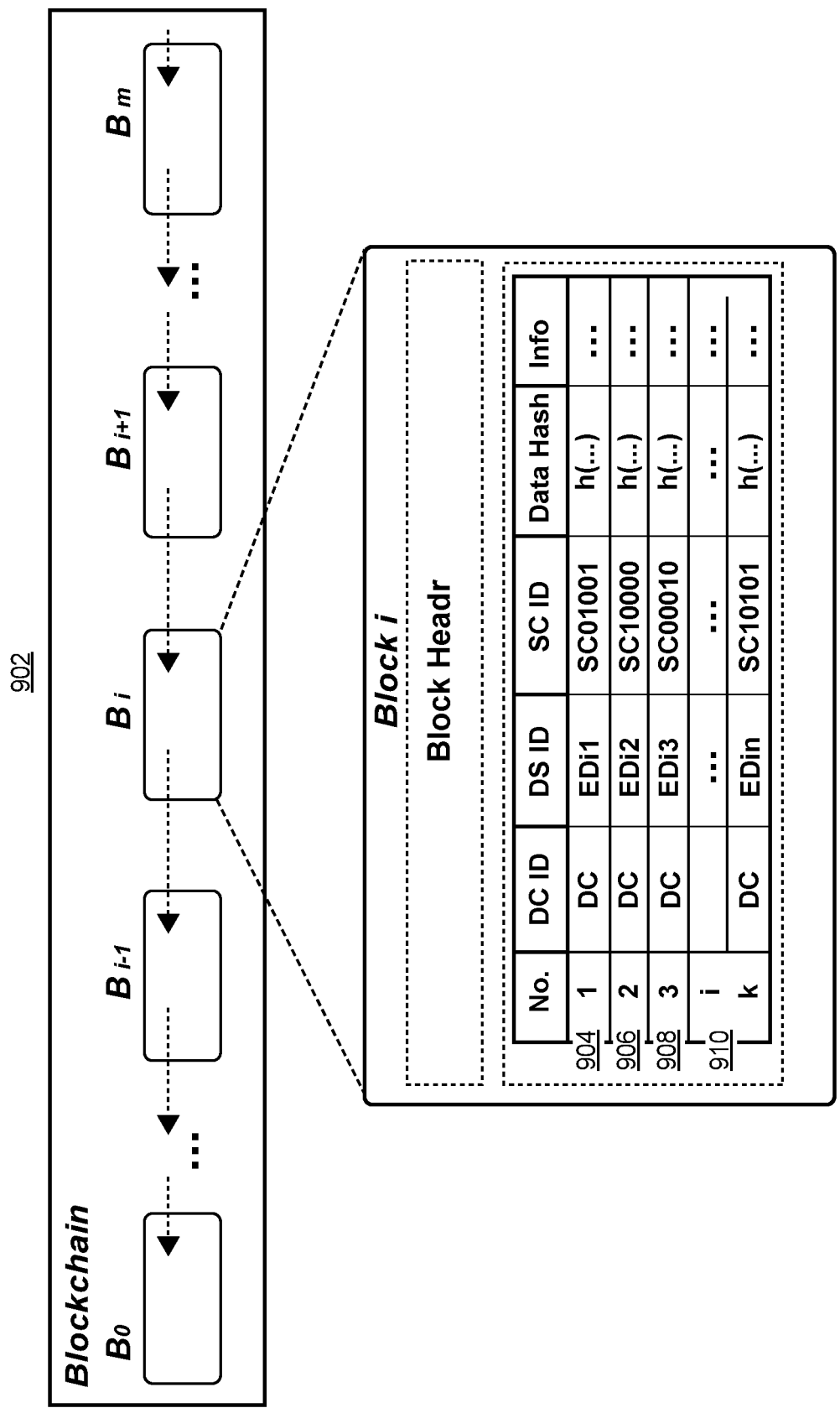
FIG. 9 illustrates example transactions generated by storage centers which are included in a blockchain.

When a set or a subset of encrypted measurement data is stored at a particular storage center, the storage center generates a transaction representing the storage operation and broadcasts the transaction to a distributed ledger network. The transaction is then validated by validating nodes, such as other storage centers and included in a block. FIG. 9 illustrates example transactions 904-910 which may be included in a distributed ledger 902, such as a blockchain. The distributed ledger 902 may be similar to the distributed ledger 600 described above with reference to FIG. 6. In any event, each transaction 904-910 may include a transaction identifier (ID) (e.g., "1"), a data contributor ID for the data contributor that generated the set or subset of encrypted measurement data (e.g., "DC"), a data set ID identifying the particular set or subset of encrypted measurement data (e.g., "EDi1"), a storage center ID identifying the storage center that stores the set or subset of encrypted measurement data (e.g., "SC01001"), and an indication of the set or subset of encrypted measurement data such as a cryptographic hash value corresponding to the set or subset of encrypted measurement data.

Figure 10:
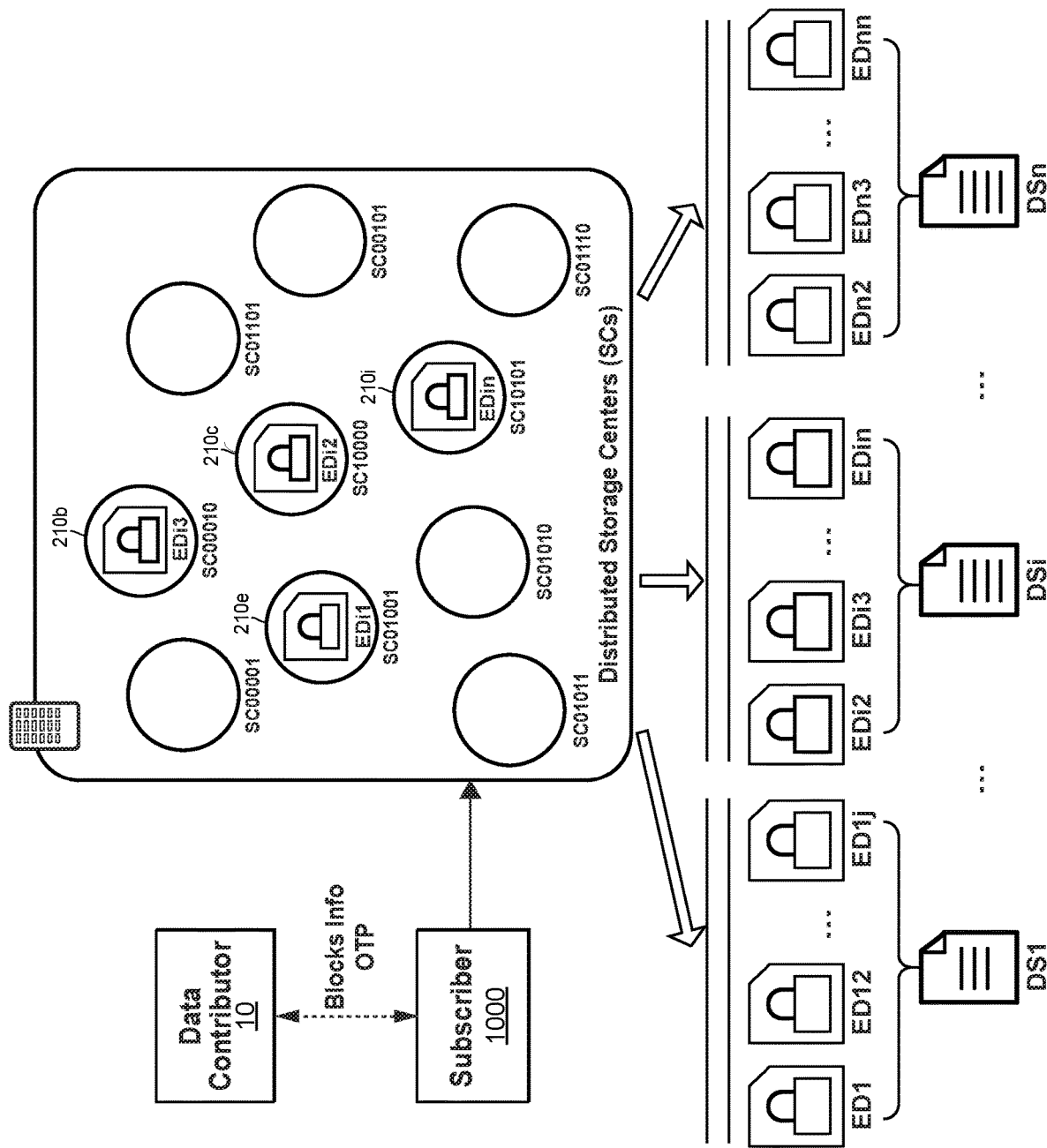
FIG. 10 illustrates an example interaction between a data contributor, a storage center, and a data subscriber for retrieving a set of measurement data.

In some implementations, the storage center 210 provides the transaction data such as the transaction ID to the data contributor 10. Then when a data subscriber requests a set of measurement data, the data contributor 10 can provide the transaction ID to the data subscriber for retrieving the necessary information from the distributed ledger. An example of this is illustrated in FIG. 10. As shown in FIG. 10, a data subscriber 1000 requests a set of measurement data from a data contributor 10. The set of measurement data is stored in several storage centers SC01001 (ref no. 210e), SC10000 (ref. no. 210c), SC00010 (ref no. 210b), and SC10101 (ref no. 210i) as subsets of encrypted measurement data. Each subset of encrypted measurement data is also referenced in a transaction in the distributed ledger.

In response to the request, the data contributor 10 provides the data subscriber 1000 with block information or transaction data for the transactions in the distributed ledger that reference the subsets of encrypted measurement data within the set. This may include transaction IDs which may be used to retrieve the corresponding transactions from the distributed ledger. For each transaction, the data subscriber 1000 may obtain a data contributor ID for the data contributor that generated the set or subset of encrypted measurement data (e.g., "DC"), a data set ID identifying the particular set or subset of encrypted measurement data (e.g., "EDi1"), a storage center ID identifying the storage center that stores the set or subset of encrypted measurement data (e.g., "SC01001"), and an indication of the set or subset of encrypted measurement data such as a cryptographic hash value corresponding to the set or subset of encrypted measurement data.

The data contributor 10 also provides the data subscriber 1000 with one-time cryptographic keys or one-time pads for decrypting each subset of encrypted measurement data. As mentioned above, the data contributor 10 may encrypt each subset of encrypted measurement data using a one-time cryptographic key unique to the subset. Accordingly, the data contributor 10 provides these one-time cryptographic keys to the data subscriber 1000, so that the data subscriber 1000 may decrypt each subset of encrypted measurement data and combine the subsets of measurement data to generate the set of measurement data.

In some implementations, the data subscriber 1000 obtains each of the transactions IDs from the data contributor 10 that reference subsets of encrypted measurement data within the set, and retrieves the corresponding transactions from the distributed ledger. For each retrieved transaction, the data subscriber 1000 obtains the identity of the storage center that stores the subset of encrypted measurement data based on the storage center ID. The data subscriber 1000 then transmits a request to the identified storage center 210 for the subset of encrypted measurement data corresponding to the data set ID. Accordingly, the storage center 210 retrieves the subset of encrypted measurement data corresponding to the data set ID and provides it to the data subscriber 1000.

Furthermore, the data subscriber 1000 compares the subset of encrypted measurement data to the cryptographic hash value corresponding to the subset of encrypted measurement data included in the transaction. For example, the data subscriber 1000 may perform a cryptographic hashing algorithm on the subset of encrypted measurement data and determine whether the resulting output is the same as the cryptographic hash value included in the transaction. If the resulting output is the same as the cryptographic hash value, the data subscriber 1000 may determine that the subset of encrypted measurement data has not been tampered with and may verify its authenticity. On the other hand, if the resulting output is different from the cryptographic hash value, the data subscriber 1000 may determine that the subset of encrypted measurement data has been tampered with and may not use the measurement data in its analysis or proceed any further with the measurement data.

If the resulting output is the same as the cryptographic hash value, the data subscriber 1000 decrypts the subset of encrypted measurement data using the decryption information provided by the data contributor 10, such as the one-time cryptographic key. The data subscriber 1000 may repeat this process for each subset of encrypted measurement data to generate the subsets of measurement data and may combine the subsets to generate the set of measurement data.

Figure 11:
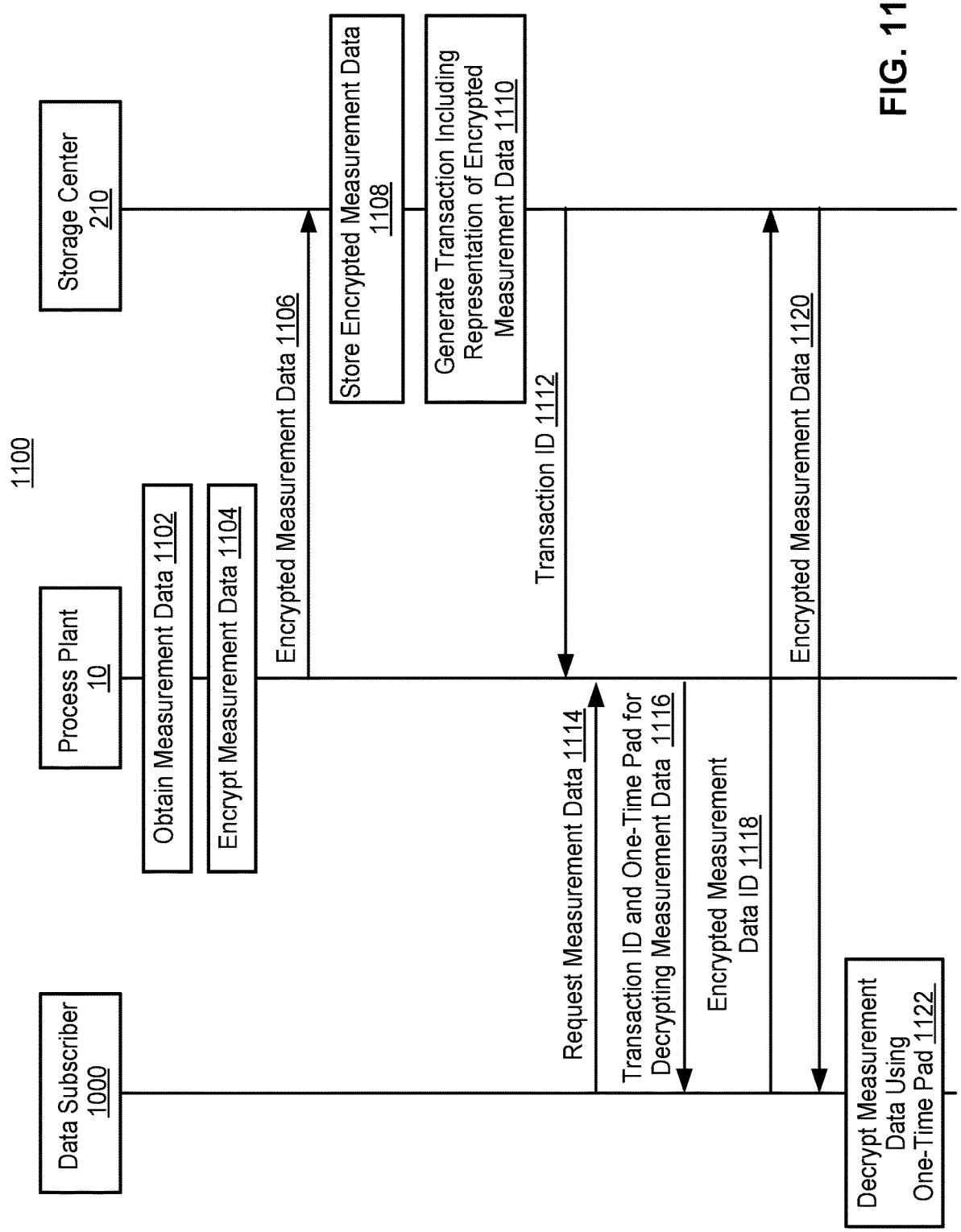
FIG. 11 is a message diagram illustrating an example interaction between a data contributor, a storage center, and a data subscriber for collecting, storing, and retrieving a set of measurement data.

FIG. 11 illustrates this process is more detail in a messaging diagram 1100 illustrating an example interaction between the data contributor 10, a storage center 210, and a data subscriber 1000. A data contributor 10 such as a process plant obtains 1102 measurement data, for example from field devices 202 or process plant entities operating in the process plant 10. The measurement data may include process parameter values for process parameters corresponding to the process plant entities. The measurement data may also include product parameter values such as properties of a physical material or product produced by the process plant, including a temperature of the product, a volume of the product, a mass of the product, a density of the product, a pressure of the product, etc. Then the data contributor 10 encrypts 1104 the measurement data using a cryptographic key. In some implementations, the data contributor 10 generates a set of measurement data including several measurements collected at the same time or within a time interval (e.g., within a 30 second time interval, within a one minute time interval, etc.). The data contributor 10 then divides the set of measurement data into several subsets. For example, the set of measurement data may include 100 measurements and corresponding information regarding the measurements, such as the time of the measurement, the process parameter, process plant entity, and/or field device corresponding to the measurement, etc. The data contributor 10 may divide the 100 measurements into four subsets of measurement data each including 25 out of the 100 measurements. Then the data contributor 10 may encrypt each subset of measurement data using a different cryptographic key or a unique, one-time cryptographic key.

The data contributor 10 then provides 1106 the set of encrypted measurement data or a subset of the set of encrypted measurement data to a storage center 210. In some implementations, the data contributor 10 may provide each subset of encrypted measurement data to a different storage center 210 or may provide at least two of the subsets to different storage centers 210. In any event, the storage center 210 stores 1108 the encrypted measurement data and generates a transaction 1110 representing the storage operation. The transaction may include a transaction ID (e.g., "1"), a data contributor ID for the data contributor that generated the set or subset of encrypted measurement data (e.g., "DC"), a data set ID identifying the particular set or subset of encrypted measurement data (e.g., "EDi1"), a storage center ID identifying the storage center that stores the set or subset of encrypted measurement data (e.g., "SC01001"), and an indication of the set or subset of encrypted measurement data such as a cryptographic hash value corresponding to the set or subset of encrypted measurement data.

The storage center 210 broadcasts the transaction to the distributed ledger network, and if the broadcasted transaction satisfies consensus rules, network validators may include the transaction in a block of the distributed ledger. The storage center 210 then provides 1112 the block information to the data contributor 10, such as a transaction ID for the transaction or any other suitable information identifying the transaction in the distributed ledger.

When a data subscriber 1000 requests 1114 measurement data from the data contributor 10 that includes the set of measurement data, the data contributor 10 provides 1116 block information such as a transaction ID for retrieving the transaction that includes the set of encrypted measurement data from the distributed ledger and a one-time cryptographic key for decrypting the set of encrypted measurement data. When the set of measurement data is divided into several subsets, the data contributor 10 may provide transaction IDs and one-time cryptographic keys for retrieving and decrypting each subset of encrypted measurement data. In any event, the data subscriber 1000 retrieves the transactions corresponding to the transaction IDs from the distributed ledger. For each retrieved transaction, the data subscriber 1000 obtains the identity of the storage center that stores the subset of encrypted measurement data based on the storage center ID. The data subscriber 1000 then transmits 1118 a request to the identified storage center 210 for the subset of encrypted measurement data corresponding to the data set ID. Accordingly, the storage center 210 retrieves the subset of encrypted measurement data corresponding to the data set ID and provides 1120 it to the data subscriber 1000.

Furthermore, the data subscriber 1000 compares the subset of encrypted measurement data to the cryptographic hash value corresponding to the subset of encrypted measurement data included in the transaction. For example, the data subscriber 1000 may perform a cryptographic hashing algorithm on the subset of encrypted measurement data and determine whether the resulting output is the same as the cryptographic hash value included in the transaction. If the resulting output is the same as the cryptographic hash value, the data subscriber 1000 may determine that the subset of encrypted measurement data has not been tampered with and may verify its authenticity. On the other hand, if the resulting output is different from the cryptographic hash value, the data subscriber 1000 may determine that the subset of encrypted measurement data has been tampered with and may not use the measurement data in its analysis or proceed any further with the measurement data.

If the resulting output is the same as the cryptographic hash value, the data subscriber 1000 decrypts 1122 the subset of encrypted measurement data using the decryption information provided by the data contributor 10, such as the one-time cryptographic key. The data subscriber 1000 may repeat this process for each subset of encrypted measurement data to generate the subsets of measurement data and may combine the subsets to generate the set of measurement data.

Figure 12:
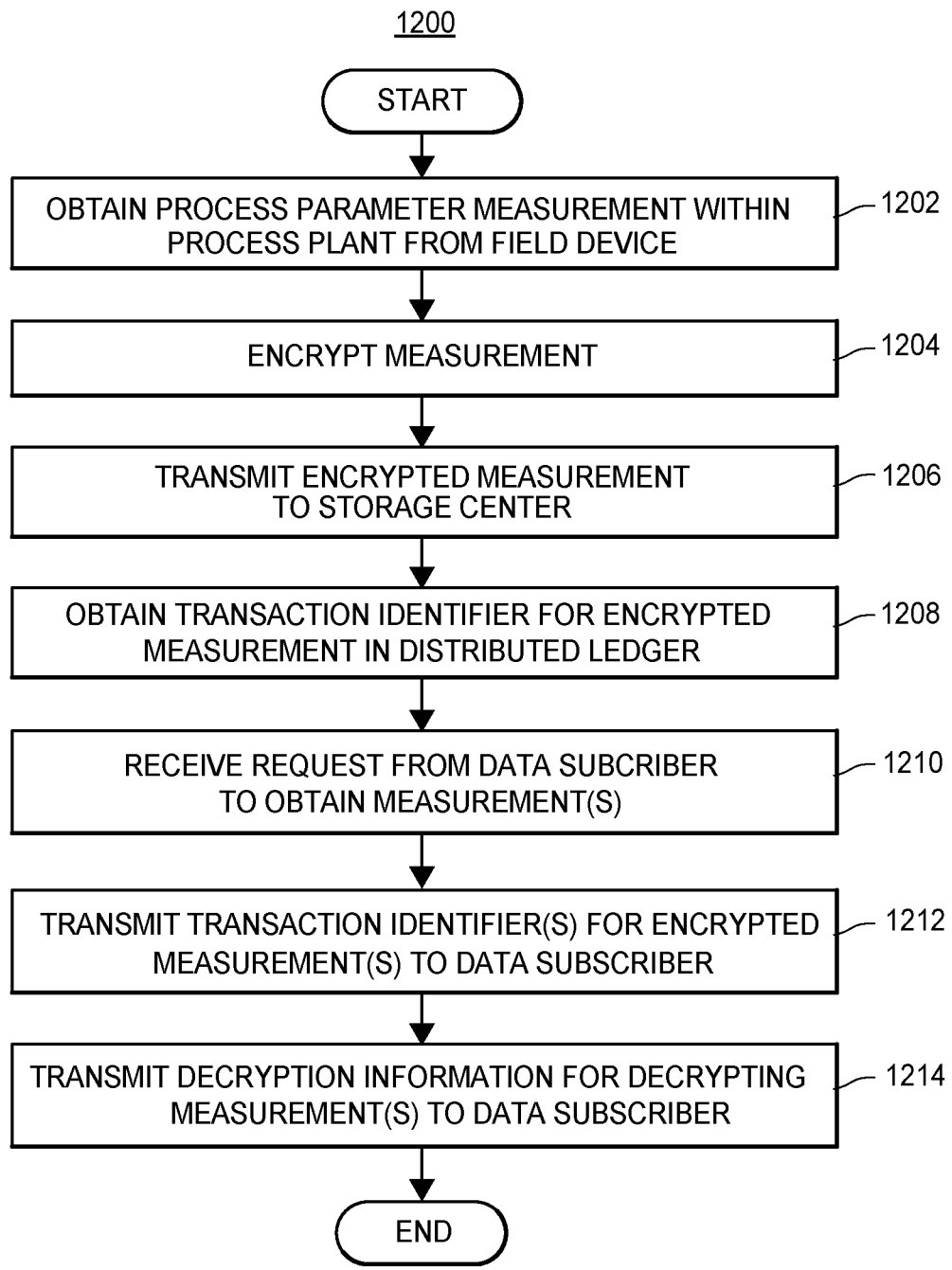
FIG. 12 illustrates a flow diagram representing an exemplary method for securely storing measurement data in a process plant at a storage center using a distributed ledger.

FIG. 12 illustrates a flow diagram representing an exemplary method 1200 for securely storing measurement data in a process plant at a storage center using a distributed ledger. The method 1200 may be executed by an edge gateway 218 within the process plant 10, a controller 11 in the process plant 10, or another computing device within the process plant 10 such as an operator workstation, server device 12, user interface device 8, I/O device 26, 28, network device 35, etc.

At block 1202, measurement data related to a process control element is obtained from a field device. The process control element may be a field device, a controller, or a process plant entity such as a valve, a tank, a mixer, a pump, a heat exchanger, etc. The measurement data may include process parameter data for parameters of the process control element (e.g., a tank fill level, a pump speed, the temperature in a heat exchanger), and product parameter data for a product entering, exiting, within, and/or controlled by the process control element (e.g., the temperature of a fluid in a tank, the flow rate of fluid exiting a valve). In some implementations, the edge gateway 218 obtains a set of measurement data including several measurements collected at the same time or within a time interval (e.g., within a 30 second time interval, within a one minute time interval, etc.). The edge gateway 218 then divides the set of measurement data into several subsets. Then at block 1204, the measurement data is encrypted. For example, the edge gateway 218 may encrypt each subset of measurement data using a different cryptographic key or a unique, one-time cryptographic key.

At block 1206, the set of encrypted measurement data is transmitted to a storage center 210. In some implementations, each subset of encrypted measurement data is transmitted to a different storage center 210 or at least two of the subsets are transmitted to different storage centers 210. In response to receiving the set of encrypted measurement data, the storage center 210 stores the set and generates a transaction representing the storage operation. The storage center 210 broadcasts the transaction to a distributed ledger network to be included in a distributed ledger. Then at block 1208, the edge gateway 218 receives the block information from the storage center, such as a transaction ID for the transaction or any other suitable information identifying the transaction in the distributed ledger.

In response to a request for the set of measurement data from a data subscriber 1000 (block 1210), the edge gateway 218 transmits block information such as a transaction ID for retrieving the transaction that includes the set of encrypted measurement data from the distributed ledger (block 1212) and a one-time cryptographic key for decrypting the set of encrypted measurement data (block 1214). When the set of measurement data is divided into several subsets, the edge gateway 218 may provide transaction IDs and one-time cryptographic keys for retrieving and decrypting each subset of encrypted measurement data.

In this manner, the data subscriber 1000 may retrieve the transaction(s) corresponding to the transaction ID(s) from the distributed ledger, identify the storage center(s) storing the encrypted measurement data, and provide identification information for the encrypted measurement data to the identified storage center(s) to retrieve the encrypted measurement data. The data subscriber may also verify the authenticity of the encrypted measurement data by comparing the encrypted measurement data to the cryptographic hash value(s) corresponding to the encrypted measurement data which is/are included in the transaction(s) in the distributed ledger. Moreover, the data subscriber 1000 may decrypt the encrypted measurement data using the one-time cryptographic key(s).

Figure 13:
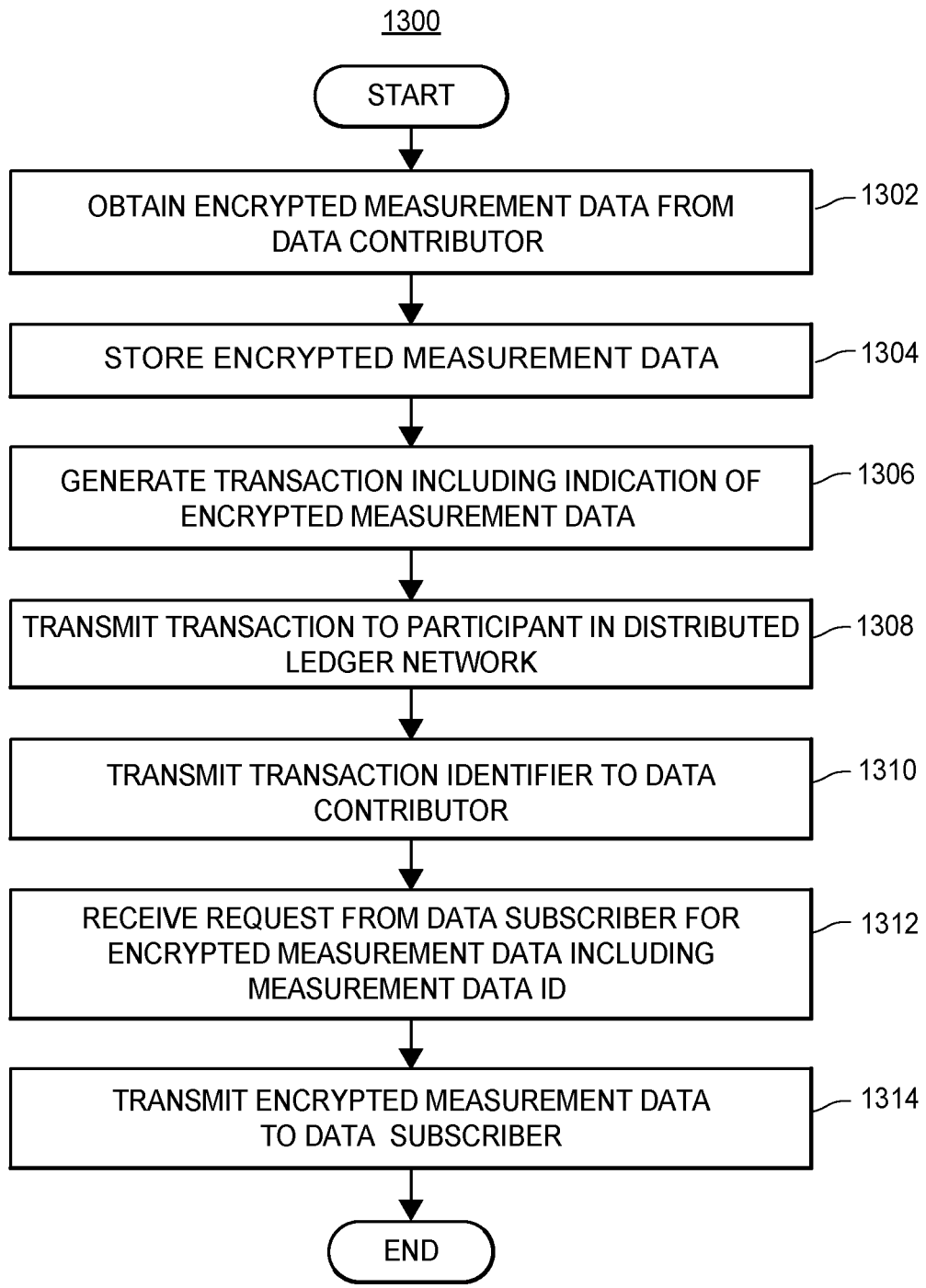
FIG. 13 illustrates a flow diagram representing an exemplary method for storing measurement data using a distributed ledger maintained by a plurality of participants.

FIG. 13 illustrates a flow diagram representing an exemplary method 1300 for storing measurement data using a distributed ledger maintained by a plurality of participants. The method 1300 may be executed by a storage center 210 such as a storage center computing device.

At block 1302, the storage center 210 obtains encrypted measurement data which may be a set of encrypted measurement data or a subset of encrypted measurement data, where the other subsets are provided to different storage centers. The encrypted measurement data may be obtained from a data contributor 10, such as a process plant, a hospital, or any other suitable source of large data sets.

Then at block 1304, the storage center 210 stores the encrypted measurement data with an identifier for retrieving the encrypted measurement data, such as a data set ID. In addition to storing the encrypted measurement data, the storage center 210 generates a transaction representing the storage operation and including an indication of the encrypted measurement data (block 1306). The transaction may include a transaction ID, a data contributor ID for the data contributor that generated the set or subset of encrypted measurement data, a data set ID identifying the particular set or subset of encrypted measurement data, a storage center ID identifying the storage center that stores the set or subset of encrypted measurement data, and an indication of the set or subset of encrypted measurement data such as a cryptographic hash value corresponding to the set or subset of encrypted measurement data.

The storage center 210 broadcasts the transaction to the distributed ledger network, and if the broadcasted transaction satisfies consensus rules, network validators may include the transaction in a block of the distributed ledger (block 1308). The storage center 210 then provides the block information to the data contributor 10, such as a transaction ID for the transaction or any other suitable information identifying the transaction in the distributed ledger (block 1310).

In response to a request for the encrypted measurement data from a data subscriber 1000 including a data set ID identifying the encrypted measurement data (block 1312), the storage center 210 provides the encrypted measurement data to the data subscriber (block 1314).

Figure 14:
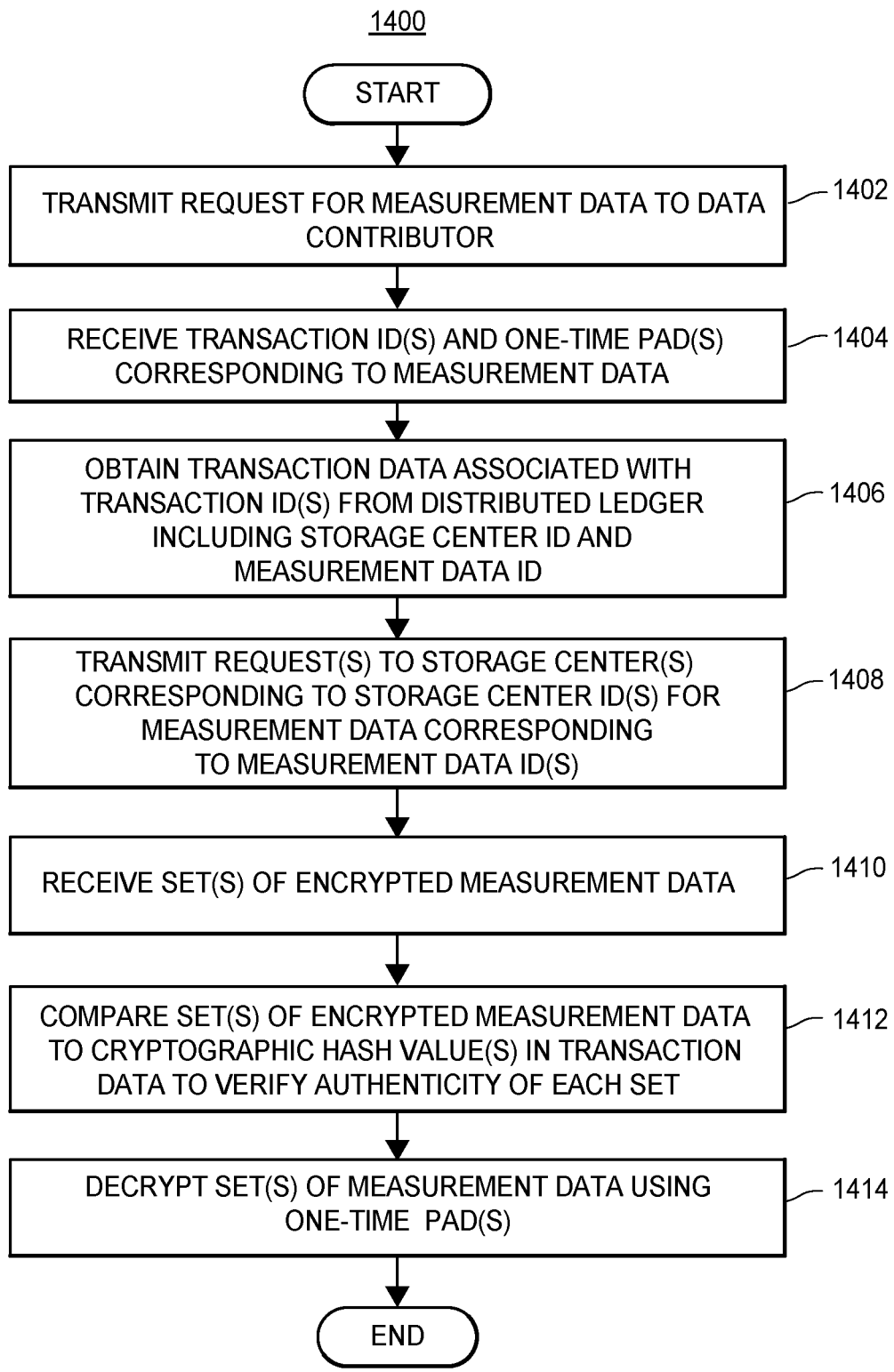
FIG. 14 illustrates a flow diagram representing an exemplary method for obtaining securely stored measurement data from a storage center and a distributed ledger.

FIG. 14 illustrates a flow diagram representing an exemplary method 1400 for obtaining securely stored measurement data from a storage center and a distributed ledger. The flow diagram 1400 may be executed by a data subscriber 1000 such as a data subscriber computing device.

At block 1402, the data subscriber 1000 transmits a request for measurement data from a data contributor 10, such as a process plant. The request for measurement data may be for a particular set of measurement data such as a set of measurement data corresponding to the most recent time interval (e.g., the previous 30 seconds). At block 1404, the data subscriber 1000 receives block information including a transaction ID for retrieving a transaction in a distributed ledger that references an encrypted version of the set of measurement data stored in a storage center 212, and a one-time cryptographic key for decrypting the encrypted measurement data. When the set of measurement data is divided into several subsets, the data contributor 10 may provide transaction IDs and one-time cryptographic keys for retrieving and decrypting each subset of encrypted measurement data.

The data subscriber 1000 retrieves the transactions corresponding to the transaction IDs from the distributed ledger (block 1406). For each retrieved transaction, the data subscriber 1000 obtains the identity of the storage center that stores the subset of encrypted measurement data based on the storage center ID and an identifier of the subset of encrypted measurement data, such as a data set ID. The data subscriber 1000 then transmits a request to the identified storage center 210 for the subset of encrypted measurement data corresponding to the data set ID (block 1408). Accordingly, the storage center 210 retrieves the subset of encrypted measurement data corresponding to the data set ID and provides it to the data subscriber 1000 (block 1410).

Furthermore, the data subscriber 1000 compares the subset of encrypted measurement data to the cryptographic hash value corresponding to the subset of encrypted measurement data included in the transaction (block 1412). For example, the data subscriber 1000 may perform a cryptographic hashing algorithm on the subset of encrypted measurement data and determine whether the resulting output is the same as the cryptographic hash value. If the resulting output is the same as the cryptographic hash value, the data subscriber 1000 may determine that the subset of encrypted measurement data has not been tampered with and may verify its authenticity. On the other hand, if the resulting output is different from the cryptographic hash value, the data subscriber 1000 may determine that the subset of encrypted measurement data has been tampered with and may not use the measurement data in its analysis or proceed any further with the measurement data.

If the resulting output is the same as the cryptographic hash value, the data subscriber 1000 decrypts the subset of encrypted measurement data using the decryption information provided by the data contributor 10, such as the one-time cryptographic key (block 1414). The data subscriber 1000 may repeat this process for each subset of encrypted measurement data to generate the subsets of measurement data and may combine the subsets to generate the set of measurement data.

Embodiments of the techniques described in the present disclosure may include any number of the following aspects, either alone or combination:

1. A method for securely storing measurement data in a process plant at a storage center using a distributed ledger, the method comprising: collecting, by a field device performing a physical function to control an industrial process in a process plant, a measurement of a parameter within the process plant; obtaining, by a computing device, the measurement of the parameter within the process plant; encrypting the measurement; transmitting the encrypted measurement to a storage center which stores the encrypted measurement; obtaining, by the computing device, identification information for retrieving a transaction representing a storage operation performed by the storage center for the encrypted measurement, wherein the transaction is included in a distributed ledger; receiving, at the computing device, a request from a data subscriber to obtain the measurement; transmitting, to the data subscriber, the identification information for retrieving the transaction; and transmitting, to the data subscriber, decryption information for decrypting the encrypted measurement.

2. The method according to aspect 1, wherein the data subscriber retrieves the encrypted measurement and compares the encrypted measurement to a cryptographic hash value corresponding to the encrypted measurement included in the distributed ledger to verify authenticity of the encrypted measurement.

3. The method according to any one of the preceding aspects, wherein the transaction includes an identifier of the storage center storing the encrypted measurement data, an identifier of the computing device which generated the encrypted measurement data, an identifier for retrieving the encrypted measurement data, and a cryptographic hash value corresponding to the encrypted measurement data.

4. The method according to any one of the preceding aspects, wherein transmitting, to the data subscriber, the identification information for retrieving the transaction includes transmitting, to the data subscriber, a transaction identifier corresponding to the transaction in the distributed ledger that includes the encrypted measurement.

5. The method according to any one of the preceding aspects, wherein transmitting decryption information for decrypting the encrypted measurement includes transmitting, to the data subscriber, a one-time cryptographic key for decrypting the encrypted measurement.

6. The method according to any one of the preceding aspects, further comprising: obtaining, by the computing device, a plurality of measurements of a plurality of parameters within the process plant; encrypting each of the plurality of measurements; and transmitting the plurality of encrypted measurements to a plurality of storage centers.

7. The method according to any one of the preceding aspects, wherein in response to a request from the data subscriber to obtain at least some of the plurality of measurements, transmitting, to the data subscriber, identification information for retrieving transactions including identifiers of at least some of the plurality of storage centers storing the at least some measurements.

8. A method for storing measurement data using a distributed ledger maintained by a plurality of participants, the method comprising: obtaining, at a computing device, encrypted measurement data from a data contributor which generated and encrypted the measurement data; storing the encrypted measurement data; generating a transaction including an indication of the encrypted measurement data; transmitting the transaction to at least one other participant in a distributed ledger network of participants maintaining a distributed ledger; transmitting, to the data contributor, identification information for retrieving the encrypted measurement data; receiving, at the computing device from a data subscriber, a request for the encrypted measurement data including an identifier of the encrypted measurement data; and in response to the request, transmitting the encrypted measurement data to the data subscriber.

9. The method according to aspect 8, wherein generating a transaction includes generating the transaction including an identifier of the computing device storing the encrypted measurement data, an identifier of the data contributor which generated the encrypted measurement data, an identifier for retrieving the encrypted measurement data, and a cryptographic hash value corresponding to the encrypted measurement data.

10. The method according to either one of aspect 8 or aspect 9, wherein the data subscriber compares the encrypted measurement data to the cryptographic hash value to verify authenticity of the encrypted measurement data.

11. The method according to any one of aspects 8-10, wherein transmitting identification information for retrieving the encrypted measurement data includes transmitting, to the data contributor, a transaction identifier corresponding to the transaction in the distributed ledger that includes the encrypted measurement data.

12. The method according to any one of aspects 8-11, wherein generating the transaction includes: generating a cryptographic signature based on the transaction; and augmenting the transaction with the cryptographic signature.

13. The method according to any one of aspects 8-12, further comprising: adding the transaction to a block of transactions; solving a cryptographic puzzle based on the block of transactions; adding the solution to the cryptographic puzzle to the block of transactions; and transmitting the block of transactions to at least one other participant in the distributed ledger network.

14. A validating network node on a distributed ledger network comprising: a transceiver configured to communicate with one or more data contributors each generating and encrypting measurement data and to exchange distributed ledger data with peer network nodes, the distributed ledger data including transactions representing storage operations for sets of encrypted measurement data; a storage media configured to store a copy of the distributed ledger; and a validator configured to apply a set of consensus rules to the distributed ledger data received from the peer network nodes, the validator being further configured to append the distributed ledger data received from the peer network nodes to the copy of the distributed ledger if the distributed ledger data satisfies the consensus rules.

15. The validating network node according to aspect 14, wherein the distributed ledger data received from the peer nodes includes a proof-of-identity of a storage center storing one of the sets of encrypted measurement data and generating one of the transactions representing a storage operation for the set of encrypted measurement data.

16. The validating network node according to either one of aspect 14 or aspect 15, wherein to append distributed ledger data received from peer nodes, the validator is configured to: solve a cryptographic puzzle based on a block of transactions; add the solution to the cryptographic puzzle to the block of transactions; append the block of transactions to the copy of the distributed ledger; and transmit the block of transactions to at least one of the peer network nodes in the distributed ledger network.

17. The validating network node according to any one of aspects 14-16, wherein the set of consensus rules include at least one of: formatting requirements for transactions or blocks of transactions; a mechanism to determine which of the peer network nodes will add a next transaction or block of transactions to the distributed ledger; or a cryptographic hashing algorithm for hashing the set of encrypted measurement data included in each of the transactions.

18. The validating network node according to any one of aspects 14-17, wherein each transaction includes an identifier for a set of encrypted measurement data, an identifier of a storage center storing the set of encrypted measurement data, and an identifier of a data contributor which generated the set of encrypted measurement data, and a cryptographic hash value corresponding to the set of encrypted measurement data.

19. A system for storing measurement data using a distributed ledger maintained by a plurality of participants comprising: one or more devices disposed in a process plant each performing a physical function to control an industrial process; and a computing device executing in the process plant including: one or more processors; a communication unit; and a non-transitory computer-readable medium coupled to the one or more processors and the communication unit and storing instructions thereon, that when executed by the one or more processors, cause the computing device to: obtain a measurement of a parameter within the process plant from the one or more devices; encrypt the measurement; transmit the encrypted measurement to a storage center which stores the encrypted measurement; obtain identification information for retrieving a transaction representing a storage operation performed by the storage center for the encrypted measurement, wherein the transaction is included in a distributed ledger; receive a request from a data subscriber to obtain the measurement; transmit, to the data subscriber, the identification information for retrieving the encrypted measurement from the storage center; and transmit, to the data subscriber, decryption information for decrypting the encrypted measurement.

20. The system according to aspect 19, wherein the data subscriber retrieves the encrypted measurement and compares the encrypted measurement to a cryptographic hash value corresponding to the encrypted measurement included in the distributed ledger to verify authenticity of the encrypted measurement.

21. The system according to either one of aspect 19 or aspect 20, wherein the transaction includes an identifier of the storage center storing the encrypted measurement data, an identifier of the computing device which generated the encrypted measurement data, an identifier for retrieving the encrypted measurement data, and a cryptographic hash value corresponding to the encrypted measurement data.

22. The system according to any one of aspects 19-21, wherein to transmit the identification information for retrieving the transaction, the instructions cause the computing device to transmit, to the data subscriber, a transaction identifier corresponding to the transaction in the distributed ledger that includes the encrypted measurement.

23. The system according to any one of aspects 19-22, wherein to transmit decryption information for decrypting the encrypted measurement, the instructions cause the computing device to transmit, to the data subscriber, a one-time cryptographic key for decrypting the encrypted measurement.

24. The system according to any one of aspects 19-23, wherein the instructions further cause the computing device to: obtain a plurality of measurements of a plurality of parameters within the process plant; encrypt each of the plurality of measurements; and transmit the plurality of encrypted measurements to a plurality of storage centers.

25. The system according to any one of aspects 19-24, wherein in response to a request from the data subscriber to obtain at least some of the plurality of measurements, the instructions further cause the computing device to transmit, to the data subscriber, identification information for retrieving transactions including identifiers of at least some of the plurality of storage centers storing the at least some measurements.

26. The system according to any one of aspects 19-25, wherein the at least some measurements are included in a data set and stored in different storage centers as subsets of the data set.

27. A method for obtaining securely stored measurement data from a storage center and a distributed ledger, the method comprising: transmitting, by a computing device, a request for measurement data generated by a data contributor; receiving, from the data contributor, identification information for retrieving an encrypted version of the measurement data from a storage center which stores the encrypted measurement data including receiving a transaction identifier corresponding to a transaction in a distributed ledger that includes an indication of the encrypted measurement data; receiving, from the data contributor, decryption information for decrypting the encrypted measurement data; obtaining transaction data associated with the transaction identifier from the distributed ledger, including an identifier of the storage center which stores the encrypted measurement data; transmitting, to the identified storage center, a request for the encrypted measurement data; receiving the encrypted measurement data from the storage center; comparing the encrypted measurement data to the indication of the encrypted measurement data included in the distributed ledger; and in response to determining that the encrypted measurement data corresponds to the indication of the encrypted measurement data included in the distributed ledger, decrypting the encrypted measurement data using the decryption information to obtain the measurement data.

28. The method according to aspect 27, wherein the measurement data is a set of measurement data having a plurality of subsets of measurement data, wherein each subset is stored in a different storage center, and further comprising: receiving, from the data contributor, identification information for retrieving encrypted versions of each subset of measurement data from a plurality of storage centers, including receiving transaction identifiers corresponding to transactions in the distributed ledger that include indications of each subset of encrypted measurement data; receiving, from the data contributor, decryption information for decrypting each subset of the encrypted measurement data; transmitting, to each of the plurality of storage centers, a request for a corresponding subset of the encrypted measurement data; receiving the subsets of encrypted measurement data from the plurality of storage centers; decrypting each subset of the encrypted measurement data using the corresponding decryption information for the subset to obtain the subset of measurement data; and combining the plurality of subsets of measurement data to generate the set of measurement data.

29. The method according to either one of aspect 27 or aspect 28, wherein obtaining transaction data includes obtaining an identifier of the storage center storing the encrypted measurement data, an identifier of the data contributor which generated the encrypted measurement data, an identifier for retrieving the encrypted measurement data, and a cryptographic hash value corresponding to the encrypted measurement data.

30. The method according to any one of aspects 27-29, wherein comparing the encrypted measurement data to the indication of the encrypted measurement data included in the distributed ledger includes comparing the encrypted measurement data to the cryptographic hash value corresponding to the encrypted measurement data.

31. The method according to any one of aspects 27-30, wherein receiving decryption information includes receiving, from the data contributor, a one-time cryptographic key for decrypting the encrypted measurement data.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method for securely storing measurement data in a process plant at a storage center using a distributed ledger, the method comprising:
   collecting, by a field device performing a physical function to control an industrial process in a process plant, a measurement of a parameter within the process plant;
   obtaining, by a computing device, the measurement of the parameter within the process plant;
   encrypting, by the computing device, the measurement;
   transmitting, by the computing device, the encrypted measurement to a storage center which stores the encrypted measurement;
   obtaining, by the computing device, identification information for retrieving a transaction representing a storage operation performed by the storage center for the encrypted measurement, wherein the transaction is included in a distributed ledger;
   receiving, at the computing device, a request from a data subscriber to obtain the measurement;
   transmitting, by the computing device to the data subscriber, the identification information for retrieving the transaction; and
   transmitting, by the computing device to the data subscriber, decryption information for decrypting the encrypted measurement.

2. The method of claim 1, wherein the data subscriber retrieves the encrypted measurement and compares the encrypted measurement to a cryptographic hash value corresponding to the encrypted measurement included in the distributed ledger to verify authenticity of the encrypted measurement.

3. The method of claim 1, wherein the transaction includes an identifier of the storage center storing the encrypted measurement data, an identifier of the computing device which generated the encrypted measurement data, an identifier for retrieving the encrypted measurement data, and a cryptographic hash value corresponding to the encrypted measurement data.

4. The method of claim 1, wherein transmitting, to the data subscriber, the identification information for retrieving the transaction includes transmitting, to the data subscriber, a transaction identifier corresponding to the transaction in the distributed ledger that includes the encrypted measurement.

5. The method of claim 1, wherein transmitting decryption information for decrypting the encrypted measurement includes transmitting, to the data subscriber, a one-time cryptographic key for decrypting the encrypted measurement.

6. The method of claim 1, further comprising:
   obtaining, by the computing device, a plurality of measurements of a plurality of parameters within the process plant;
   encrypting each of the plurality of measurements; and
   transmitting the plurality of encrypted measurements to a plurality of storage centers.

7. The method of claim 6, wherein in response to a request from the data subscriber to obtain at least some of the plurality of measurements, transmitting, to the data subscriber, identification information for retrieving transactions including identifiers of at least some of the plurality of storage centers storing the at least some measurements.

8. A system for storing measurement data using a distributed ledger maintained by a plurality of participants comprising:
   one or more devices disposed in a process plant each performing a physical function to control an industrial process; and
   a computing device executing in the process plant including:
      one or more processors;
      a communication unit; and
      a non-transitory computer-readable medium coupled to the one or more processors and the communication unit and storing instructions thereon, that when executed by the one or more processors, cause the computing device to:
         obtain a measurement of a parameter within the process plant from the one or more devices;
         encrypt the measurement;
         transmit the encrypted measurement to a storage center which stores the encrypted measurement;
         obtain identification information for retrieving a transaction representing a storage operation performed by the storage center for the encrypted measurement, wherein the transaction is included in a distributed ledger;
         receive a request from a data subscriber to obtain the measurement;
         transmit, to the data subscriber, the identification information for retrieving the transaction; and
         transmit, to the data subscriber, decryption information for decrypting the encrypted measurement.

9. The system of claim 8, wherein the data subscriber retrieves the encrypted measurement and compares the encrypted measurement to a cryptographic hash value corresponding to the encrypted measurement included in the distributed ledger to verify authenticity of the encrypted measurement.

10. The system of claim 8, wherein the transaction includes an identifier of the storage center storing the encrypted measurement data, an identifier of the computing device which generated the encrypted measurement data, an identifier for retrieving the encrypted measurement data, and a cryptographic hash value corresponding to the encrypted measurement data.

11. The system of claim 8, wherein to transmit the identification information for retrieving the transaction, the instructions cause the computing device to transmit, to the data subscriber, a transaction identifier corresponding to the transaction in the distributed ledger that includes the encrypted measurement.

12. The system of claim 8, wherein to transmit decryption information for decrypting the encrypted measurement, the instructions cause the computing device to transmit, to the data subscriber, a one-time cryptographic key for decrypting the encrypted measurement.

13. The system of claim 8, wherein the instructions further cause the computing device to:
   obtain a plurality of measurements of a plurality of parameters within the process plant;
   encrypt each of the plurality of measurements; and
   transmit the plurality of encrypted measurements to a plurality of storage centers.

14. The system of claim 13, wherein in response to a request from the data subscriber to obtain at least some of the plurality of measurements, the instructions further cause the computing device to transmit, to the data subscriber, identification information for retrieving transactions including identifiers of at least some of the plurality of storage centers storing the at least some measurements.

15. The system of claim 13, wherein the at least some measurements are included in a data set and stored in different storage centers as subsets of the data set.

* * * * *